(12) United States Patent
Cai et al.

(10) Patent No.: US 7,839,951 B2
(45) Date of Patent: Nov. 23, 2010

(54) DYNAMIC CREST FACTOR REDUCTION SYSTEM

(75) Inventors: Khiem V. Cai, Brea, CA (US); Samuel Davis Kent, III, Long Beach, CA (US)

(73) Assignee: Microelectronics Technology Inc. (TW)

( * ) Notice: Subject to any disclaimer, the term of this patent is extended or adjusted under 35 U.S.C. 154(b) by 901 days.

(21) Appl. No.: 11/784,433

(22) Filed: Apr. 5, 2007

(65) Prior Publication Data

US 2008/0247487 A1    Oct. 9, 2008

(51) Int. Cl.
*H04K 1/02* (2006.01)

(52) U.S. Cl. ...................................... 375/297; 375/350

(58) Field of Classification Search .................. 375/297, 375/278, 285, 346, 350
See application file for complete search history.

(56) References Cited

U.S. PATENT DOCUMENTS

2005/0130615 A1*  6/2005  Darabi ..................... 455/232.1

* cited by examiner

*Primary Examiner*—Emmanuel Bayard
(74) *Attorney, Agent, or Firm*—Carlos R. Villamar; The Villamar Firm PLLC

(57) ABSTRACT

A system and method for performing digital crest factor reduction. In one embodiment, the method is devised to suppress the signal amplitude to maintain a low signal peak to average ratio (PAR), while maintaining a desirable Error Vector Magnitude (EVM). This technique may be designed to operate in highly dynamic signal conditions.

108 Claims, 16 Drawing Sheets

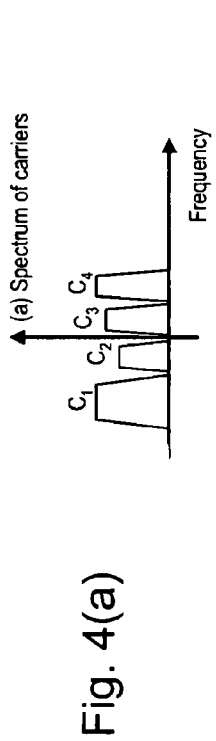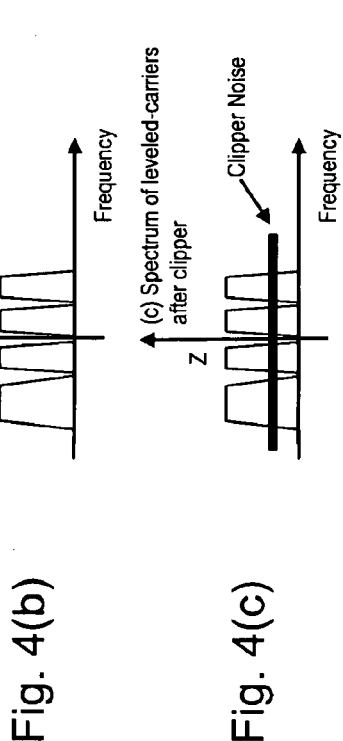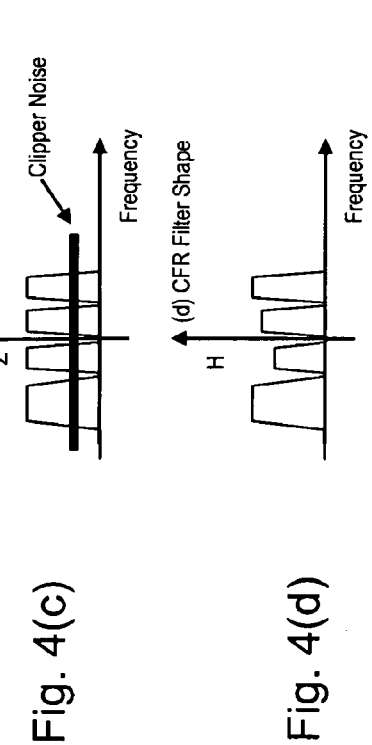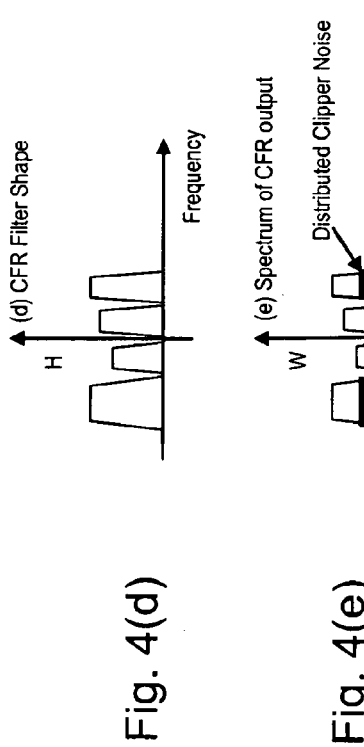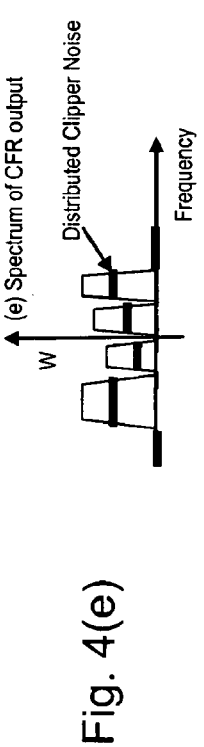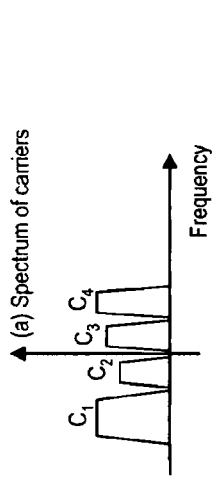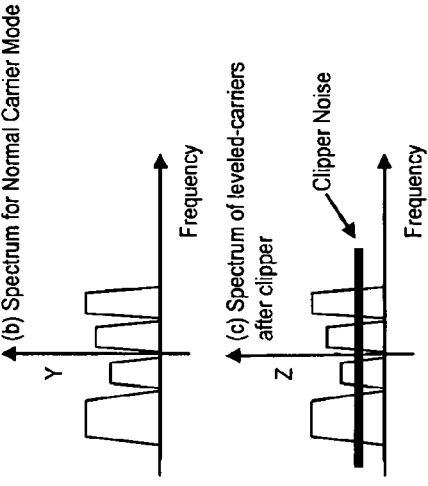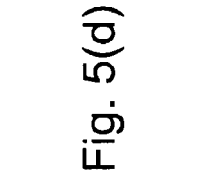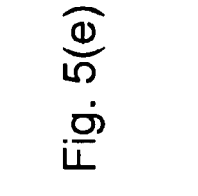

DYNAMIC CREST FACTOR REDUCTION SYSTEM

CROSS-REFERENCE TO RELATED APPLICATION

This application contains subject matter that is related to U.S. patent application Ser. No. 11/246,027, filed Oct. 7, 2005, entitled "SYSTEM AND METHOD FOR CREST FACTOR REDUCTION." The entire content of the above-referenced application is incorporated herein by reference.

BACKGROUND

1. Field of the Invention

The present invention relates to electrical and electronic circuits and systems. More specifically, the present invention relates to systems and methods for reducing crest factor in electrical and electronic circuits and systems.

2. Description of the Related Art

In Multi-Carrier Power Amplifier (MCPA) communication transmission applications, multiple carriers are typically combined in the baseband, intermediate frequency (IF) or radio frequency (RF) frequency range and the resulting signal is transmitted using a single power amplifier. An aspect for MCPA transmission is to transmit a signal at a very high efficiency while maintaining a low Adjacent Channel Power Ratio (ACPR) to meet spectral mask requirements. ACPR is defined as the ratio of power in a bandwidth away from the main signal (the distortion product) to the power in a bandwidth within the main signal. The bandwidths and locations are functions of the standards being employed.

To achieve high efficiency power amplifier (PA) transmission, it is desirable to use semi-non-linear PAs, such as Class A/B PAs. A challenge for MCPA signal transmission is due to the fact that the combined signal has a high crest factor (ratio of peak power to average power), where the peak power is significantly higher than the average power. A small portion of the combined signal can have very high peaks and when transmitted at high PA efficiency, these high-level signals reach into the saturated region of the PA's transfer function and the output of the PA has high intermodulation distortion (IMD). The high IMD level raises the ACPR levels.

To maintain low ACPR without any linearization techniques, the transmit signal level must be decreased sufficiently so that the peak amplitudes are not in the saturated zone of the PA, but this reduces the amplifier efficiency. For example, a four carrier W-CDMA (wideband code division multiple access) signal can have a crest factor exceeding 13 dB. If the crest factor is reduced by about 6 dB, the average power can be increased by 6 dB thus increasing the power efficiency by a factor of 4.

One approach to this problem is to limit the amplitude of either the baseband signal or the RF signal output of each channel using a look-ahead approach. However, it is difficult to generate signals with low crest factor and low ACPR inasmuch as limiting the amplitude increases out of band emissions (e.g. sidelobes) and thereby raises the ACPR level. Similarly, efforts to reduce the ACPR levels generally increase crest factor.

Another approach involves the use of unused CDMA codes to reduce the crest factor in the output signals. However, this approach requires knowledge of what is being transmitted so that the unused codes can be identified. This adds to the complexity, storage requirements and cost of the system.

Hence, a need remains in the art for an improved system or method for reducing the crest factor in communications systems while maintaining a low ACPR therefor.

SUMMARY OF THE INVENTION

Aspects of embodiments of the present invention are directed to systems and methods for reducing crest factor in electrical and electronic circuits and systems.

In one embodiment of the present invention, a crest reduction system for gain leveling includes: an estimator for estimating a root-mean-square (RMS) level of a first signal carrier and an RMS level of a second signal carrier, each of the first and second signal carriers having an amplitude; a leveling setter for receiving the estimated RMS levels of the first and second signal carriers, for producing a first gain leveling factor and a second gain leveling factor for the first signal carrier by using the estimated RMS level of the first signal carrier, and for producing a third gain leveling factor and a fourth gain leveling factor for the second signal carrier by using the estimated RMS level of the second signal carrier; a first leveler for receiving the first signal carrier and the first gain leveling factor and for changing the amplitude of the first signal carrier by adjusting the first signal carrier according to the first gain leveling factor; a second leveler for receiving the second signal carrier and the third gain leveling factor and for changing the amplitude of the second signal carrier by adjusting the second signal carrier according to the third gain leveling factor; and a filter configurator for receiving the second and fourth gain leveling factors, for producing one or more first filter coefficients to further change the amplitude of the first signal carrier according to the second gain leveling factor, and for producing one or more second filter coefficients to further change the amplitude of the second signal carrier according to the fourth gain leveling factor. The second gain leveling factor is substantially equal to the reciprocal of the first gain leveling factor, and the fourth gain leveling factor is substantially equal to the reciprocal of the third gain leveling factor.

The estimator may include a low pass filter configured by one or more scale factors, the low pass filter being for estimating at least one of the RMS level of the first signal carrier or the RMS level of the second signal carrier.

The low pass filter may include an infinite impulse response filter.

The first signal carrier may have a first signal to distortion ratio (SDR), and the second signal carrier may have a second SDR different from the first SDR.

The first leveler may be adapted to adjust the first signal carrier according to the first gain leveling factor by multiplying the amplitude of the first signal carrier by the first gain leveling factor.

The second leveler may be adapted to adjust the second signal carrier according to the third gain leveling factor by multiplying the amplitude of the second signal carrier by the third gain leveling factor.

The second gain leveling factor may be a multiplicative factor of at least one of the one or more first filter coefficients produced by the filter configurator.

The fourth gain leveling factor may be a multiplicative factor of at least one of the one or more second filter coefficients produced by the filter configurator.

The crest reduction system may further include a leveled carrier combiner for receiving the adjusted first signal carrier from the first leveler, for receiving the adjusted second signal carrier from the second leveler, and for producing a multi-carrier signal from the adjusted first signal carrier and the adjusted second signal carrier.

The leveled carrier combiner may be adapted to produce the multi-carrier signal by coherently combining the adjusted first signal carrier and the adjusted second signal carrier.

In another embodiment of the present invention, a method for gain leveling in a crest reduction system may include: estimating a root-mean-square (RMS) level of a first signal carrier and an RMS level of a second signal carrier, each of the first and second signal carriers having an amplitude; determining a first gain leveling factor and a second gain leveling factor for the first signal carrier by using the estimated RMS level of the first signal carrier; determining a third gain leveling factor and a fourth gain leveling factor for the second signal carrier by using the estimated RMS level of the second signal carrier; changing the amplitude of the first signal carrier by adjusting the first signal carrier according to the first gain leveling factor; changing the amplitude of the second signal carrier by adjusting the second signal carrier according to the third gain leveling factor; and determining one or more first filter coefficients to further change the amplitude of the first signal carrier according to the second gain leveling factor; and determining one or more second filter coefficients to further change the amplitude of the second signal carrier according to the fourth gain leveling factor. The second gain leveling factor is substantially equal to the reciprocal of the first gain leveling factor, and the fourth gain leveling factor is substantially equal to the reciprocal of the third gain leveling factor.

In another embodiment of the present invention, a crest reduction system for amplitude limiting includes: a controller for receiving a first signal including one or more signal carriers, for determining a signal to distortion ratio (SDR) of the first signal, and for producing a correction value by using the determined SDR and a threshold SDR; and a dynamic amplitude clipper for receiving the correction value and a second signal corresponding to the first signal and for producing a clipped signal by limiting an amplitude of the second signal according to a value corresponding to the correction value such that a peak to average ratio (PAR) of the clipped signal is not greater than a PAR of the second signal. The clipped signal has phase characteristics substantially equal to phase characteristics of the second signal.

The crest reduction system may further include a second dynamic amplitude clipper coupled with the dynamic amplitude clipper, the second dynamic amplitude clipper being for receiving the correction value and a third signal corresponding to the clipped signal and for producing a second clipped signal by limiting an amplitude of the third signal according to a second value corresponding to the correction value such that a PAR of the second clipped signal is not greater than a PAR of the third signal. The second clipped signal has phase characteristics substantially equal to phase characteristics of the third signal.

The phase characteristics of the second clipped signal may be substantially equal to phase characteristics of the clipped signal.

The dynamic amplitude clipper may include an estimator for estimating a root-mean-square (RMS) level of the second signal. The value corresponding to the correction value may further correspond to the estimated RMS level of the second signal such that the PAR of the clipped signal is substantially constant over time. The second dynamic amplitude clipper may include an estimator for estimating an RMS level of the third signal. The second value corresponding to the correction value may further correspond to the estimated RMS level of the third signal such that the PAR of the second clipped signal is substantially constant over time.

The estimator for estimating the power of the second signal may include an infinite impulse response filter.

The crest reduction system may further include a gain corrector for receiving a third signal corresponding to the clipped signal and for reducing an energy loss of the third signal resulting from the limiting of the amplitude of the second signal by the dynamic amplitude clipper.

The dynamic amplitude clipper may be adapted to be controlled to produce an unclipped signal from the second signal, and a PAR of the unclipped signal may be substantially equal to the PAR of the second signal.

The crest reduction system may further include a timing and control unit for controlling the dynamic amplitude clipper to produce the unclipped signal.

The dynamic amplitude clipper may include a first multiplier for multiplying the second signal and an inverse of the value corresponding to the correction value and a second multiplier for producing the clipped signal by multiplying a third signal corresponding to the second signal and the value corresponding to the correction value.

In another embodiment of the present invention, a method for amplitude limiting in a crest reduction system includes: receiving a first signal including one or more signal carriers; determining a signal to distortion ratio (SDR) of the first signal; producing a correction value by using the determined SDR and a threshold SDR; and producing a second signal corresponding to the first signal; producing a clipped signal by limiting an amplitude of the second signal according to a value corresponding to the correction value such that a peak to average ratio (PAR) of the clipped signal is not greater than a PAR of the second signal. The clipped signal has phase characteristics substantially equal to phase characteristics of the second signal.

In another embodiment of the present invention, a crest reduction system for composite filtering includes: a timing and control unit for receiving a first signal including a plurality of signal carriers and for processing a detected absence of one or more of the signal carriers; a filter configurator for producing a plurality of composite coefficients for filtering of the signal, each of the composite coefficients being formed from a plurality of coefficients, and for zeroing one or more of the coefficients corresponding to the one or more signal carriers in response to the detected absence of the one or more signal carriers; and a filter generator for receiving the composite coefficients and for implementing a filter for a second signal corresponding to the first signal, the filter being configured to output a third signal by filtering the second signal according to the composite coefficients.

The filter may be further configured to output the third signal by substantially filtering out one or more frequency components of the second signal corresponding to the zeroed one or more of the coefficients.

The filter configurator may include a plurality of multiplexer units, each of the multiplexer units being adapted to receive one or more of the coefficients corresponding to one of the signal carriers and to output either the one or more of the coefficients or one or more zero value coefficients in response to the detected absence of the one of the signal carriers.

The filter configurator may further include a combiner for receiving the respective outputs of the multiplexer units and for producing the composite coefficients by linearly combining the respective outputs.

The crest reduction system may further include a second filter generator for receiving the composite coefficients and for implementing a second filter for a fourth signal corresponding to the third signal, the second filter being configured to output a fifth signal by filtering the fourth signal according to the composite coefficients.

The second filter may be further configured to output the fifth signal by substantially filtering out one or more frequency components of the fourth signal corresponding to the zeroed one or more of the coefficients.

A first one of the signal carriers may have a first passband, and a second one of the signal carriers may have a second passband, the first passband and the second passband forming a frequency well therebetween. The filter configurator may further be for producing a plurality of nibble coefficients for the filtering of the signal, the nibble coefficients being configured to substantially fill the frequency well.

The filter configurator may include a multiplexer unit adapted to receive one or more of the nibble coefficients corresponding to the first one of the signal carriers and the second one of the signal carriers and to output either the one or more of the nibble coefficients or one or more zero value coefficients in response to the detected absence of at least one of the first one of the signal carriers or the second one of the signal carriers.

In another embodiment of the present invention, a method for composite filtering in a crest reduction system includes: receiving a first signal including a plurality of signal carriers; processing a detected absence of one or more of the signal carriers; producing a plurality of composite coefficients for filtering of the signal, each of the composite coefficients being formed from a plurality of coefficients; zeroing one or more of the coefficients corresponding to the one or more signal carriers in response to the detected absence of the one or more signal carriers; and implementing a filter for a second signal corresponding to the first signal, the filter being configured to output a third signal by filtering the second signal according to the composite coefficients.

In another embodiment of the present invention, a crest reduction system includes: a controller for receiving a first frequency and a first bandwidth of a first baseband symbol stream and for receiving a second frequency and a second bandwidth of a second baseband symbol stream; a first carrier processor for receiving the first baseband symbol stream and for converting the first baseband symbol stream to a first signal having the first bandwidth centered about the first frequency; a second carrier processor for receiving the second baseband symbol stream and for converting the second baseband symbol stream to a second signal having the second bandwidth centered about the second frequency; and one or more signals processors for receiving the first and second signals and for adjusting a respective signal to distortion ratio (SDR) of each of the first and second signals while a peak to average ratio (PAR) of a composite signal produced from the first and second signals is reduced.

The first frequency may have a value different from a value of the second frequency.

The first bandwidth may have a frequency range different from a frequency range of the second bandwidth.

The first bandwidth may have a frequency range substantially equal to a frequency range of the second bandwidth.

The first baseband symbol stream may correspond to a WCDMA signal, and the second baseband symbol stream may correspond to a cdma2000 signal.

The crest reduction system may further include a combiner for receiving the first and second signals and for producing a multi-carrier signal from the first and second signals.

The combiner may be adapted to produce the multi-carrier signal by coherently combining the first and second signals.

The first carrier processor may be adapted to increase a sample rate of the first baseband symbol stream according to a first rate to produce a first intermediate signal, and the second carrier processor may be adapted to increase a sample rate of the second baseband symbol stream according to a second rate to produce a second intermediate signal. The first rate may have a value different from a value of the second rate. The first carrier processor may include a first resampler for resampling the first intermediate signal according to a third rate to produce the first signal, and the second carrier processor may include a second resampler for resampling the second intermediate signal according to a fourth rate substantially equal to the third rate to produce the second signal.

In another embodiment of the present invention, a method of signal converting in a crest reduction system includes: receiving a first frequency and a first bandwidth corresponding to a first baseband symbol stream; receiving a second frequency and a second bandwidth corresponding to a second baseband symbol stream; converting the first baseband symbol stream to a first signal having the first bandwidth centered about the first frequency; converting the second baseband symbol stream to a second signal having the second bandwidth centered about the second frequency; and adjusting a respective signal to distortion ratio (SDR) of each of the first and second signals while a peak to average ratio (PAR) of a composite signal produced from the first and second signals is reduced.

BRIEF DESCRIPTION OF THE DRAWINGS

The accompanying drawings, together with the specification, illustrate exemplary embodiments of the present invention, and, together with the description, serve to explain the principles of the present invention.

FIGS. 4(a), 4(b), 4(c), 4(d) and 4(e) show an example of signal processing using Carrier Leveling Mode.

FIGS. 5(a), 5(b), 5(c), 5(d) and 5(e) show an example of signal processing when Carrier Leveling Mode is bypassed.

DETAILED DESCRIPTION

In the following detailed description, only certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, and not restrictive.

Figure 1:
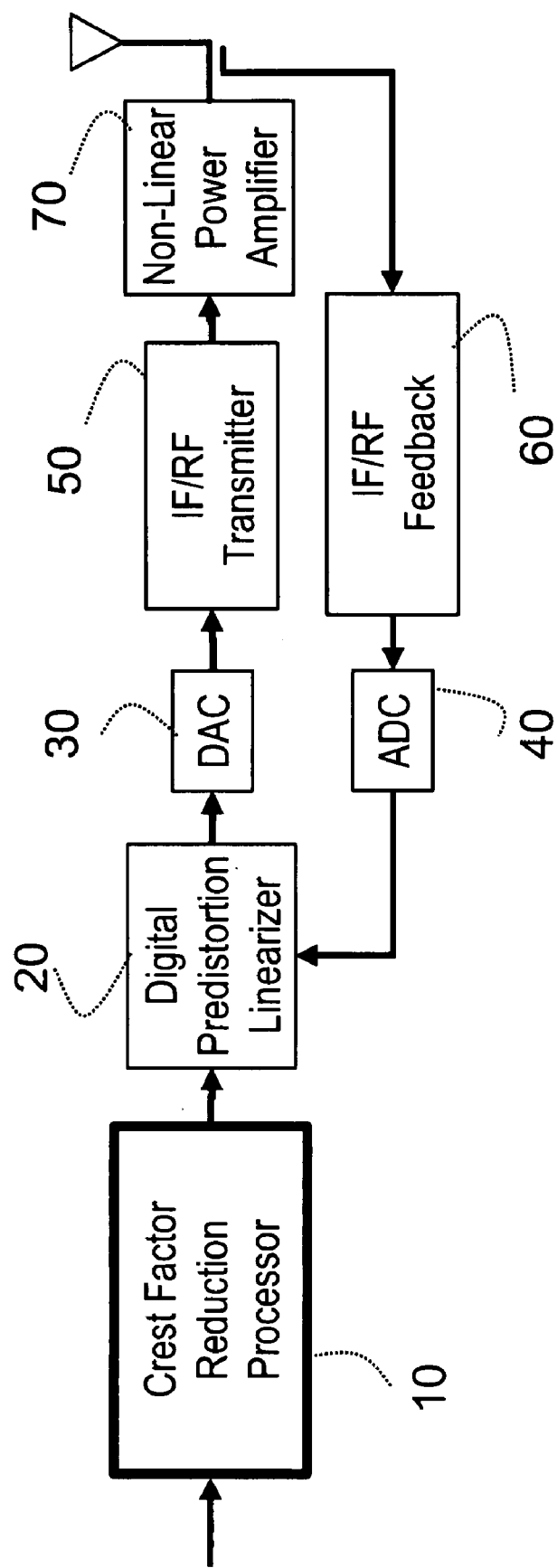
FIG. 1 is a block diagram of a Multi Carrier Power Amplifier (MCPA) transmission system with a Crest Factor Reduction (CFR) Processor according to an embodiment of the present invention.

FIG. 1 shows a block diagram of a Multi Carrier Radio Transmitter 50 using a Non Linear Power Amplifier 70. This is referred to as a Multi Carrier Power Amplifier system (MCPA). The challenge for the MCPA signal transmission is that the combined signal can have a high crest factor (the ratio of peak power to average power), where the peak power is significantly higher than the average power. A small portion of the combined signal can have very high peaks, and when transmitted at high power amplifier (PA) efficiency these high-level signals are saturated, and the output of the PA has high intermodulation distortion (IMD) that raises the adjacent channel power ratio (ACPR) levels. To improve ACPR to some acceptable level for transmission, the IMD should be effectively filtered at the output of the power amplifier or the high-level signals should be reduced prior to amplification. This reduction is one task of the Crest Factor Reduction Processor 10. In one embodiment of the present invention, the crest factor reduction processor 10 should be designed to support dynamic changes of the signal and to maintain low PAR and low ACPR.

One aspect of the present invention is directed towards reducing the crest factor of a signal in a manner that delivers low ACPR and low EVM for dynamic signals.

Figure 2:
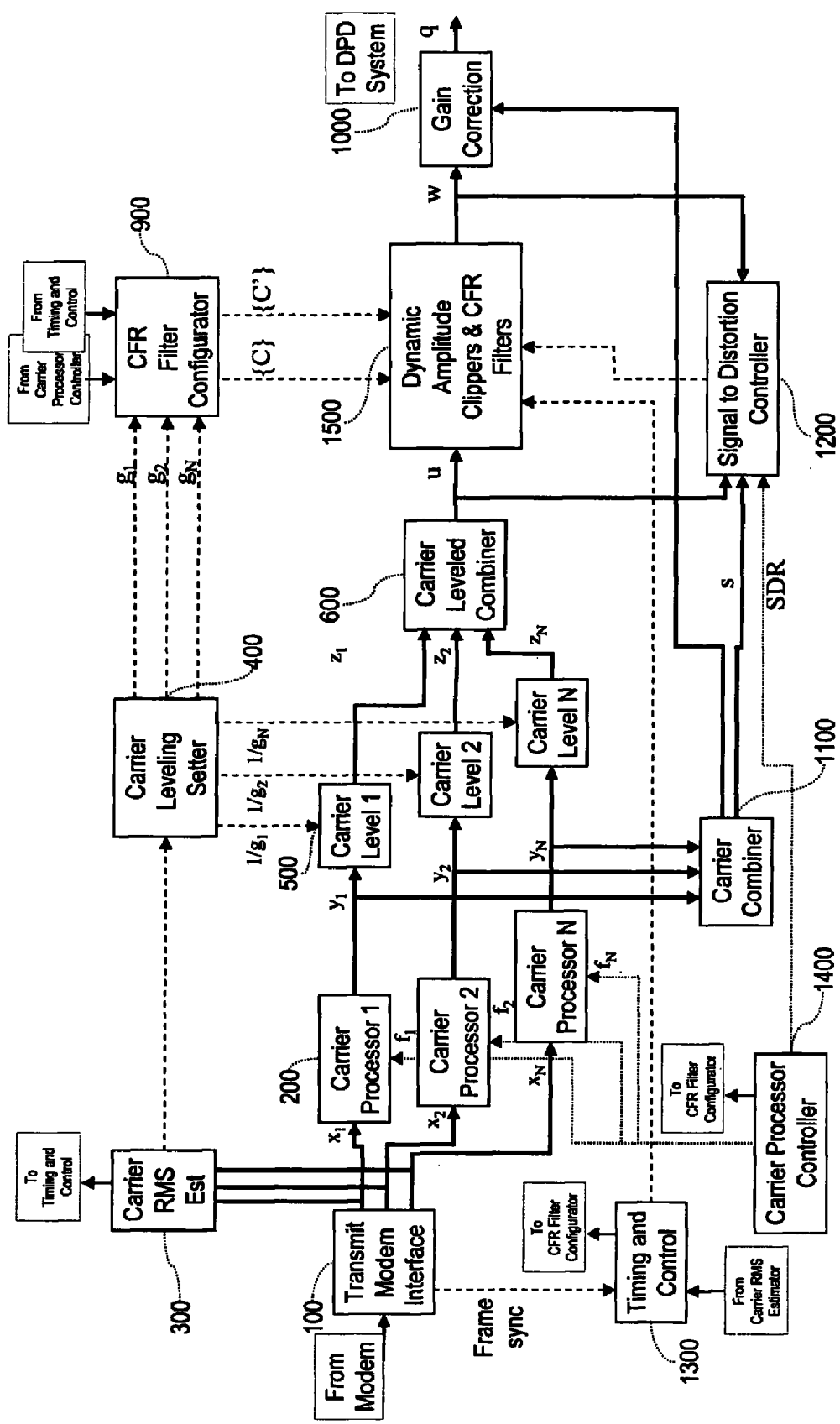
FIG. 2 is a block diagram of the CFR Processor of FIG. 1 according to one embodiment of the present invention.

FIG. 2 shows a block diagram of the Crest Factor Reduction Processor 10 according to one embodiment of the present invention. I and Q symbol streams for N carriers are received by the Transmit Modem Interface 100 to format the symbol stream $x_1[m], x_2[m], \ldots, x_N[m]$ to the Carrier Processors 200. The signal $x_k[m]$ is the symbol stream to be transmitted on the frequency $f_k$. The Transmit Modem Interface 100 also detects the frame sync timing information of the transmission, and generates the frame sync signal, which is sent to the Timing and Control 1300 to coordinate the timing of the whole system.

The Carrier Processors 200 support N channels. Each Carrier Processor 200 has a different center frequency, but can have the same or different filter types to shape similar or different signal modulations. For example, Carrier Processor 200 for Channel 1 can be for WCDMA having 3.84 MHz bandwidth; Carrier Processor 200 for Channel 2 can be for cdma2000 having 1.2288 MHz bandwidth; Carrier Processor 200 for Channel 3 can be bypassed to accommodate signals that are already shaped; and Carrier Processor 200 for Channel 4 can be for OFDM having 5 MHz bandwidth. Likewise, each channel processor can have identical bandshapes.

Each channel carrier processor converts the baseband symbol stream $x_k[m]$ to an intermediate frequency (IF) signal $y_k[m]$ center at the frequency $f_k$ with reference to FIG. 2. The carriers are then combined by the Carrier Combiner 1100 to produce a composite signal s[m] that contains multi-carriers. This signal may then be used to control the composite Signal to Distortion Ratio (SDR) and thus the EVM of each carrier.

Carrier Leveling Mode is controlled by the Carrier Leveling Setter 400, Carrier Levelers 500 and the Leveled Carrier Combiner 600. Carrier Leveling Mode provides a mechanism for setting and maintaining possibly different signal to distortion ratios for each individual carrier. In the main path, the carriers $y_k[m]$ are adjusted by gains $1/g_k$ in the Carrier Levelers 500 to force the carrier amplitudes to the desired levels. The outputs of the N Carrier Levelers, gained carriers $z_1, z_2, \ldots, z_N$ are combined using the Leveled Carrier Combiner 600 to produce the signal u[m]. This signal is fed to the Dynamic Amplitude Clippers and CFR Filters 1500 for peak amplitude suppression and to the Signal to Distortion Controller 1200 to control the peak amplitude suppression to maintain the desired SDR and thus the carriers' EVM.

An aspect of the Carrier Leveling Setter 400 is to control the amplitude of each carrier channel signal to establish the desired channel distortion or EVM. The power of each carrier is estimated using the Carrier RMS Estimator 300. Based on the carrier powers, the Carrier Leveling Setter 400 determines gain $g_k$ and $1/g_k$ that will be applied at the CFR Filter Configurator 900 and the Carrier Levelers 500. The Carrier Levelers can be bypassed when adjustments to control SDR for individual carriers are not required.

Occasionally, a first Dynamic Amplitude Clipper 700 or a second Dynamic Amplitude Clipper 700' or both contained in Dynamic Amplitude Clippers and CFR Filters 1500 (see, for example, FIG. 3) can be disabled momentarily to produce a high PAR signal if the digital predistortion processor (DPD) needs a high peak signal to characterize the PA. Upon instruction the amplitude clipper or clippers occasionally halt the clipping process for a very short period of time to produce a non-clipped signal. This high-PAR signal allows the DPD system to characterize the PA at high power for effective linearization. Because the duration of this high PAR signal is short, it does not degrade the power amplifier performance significantly.

Figure 3:
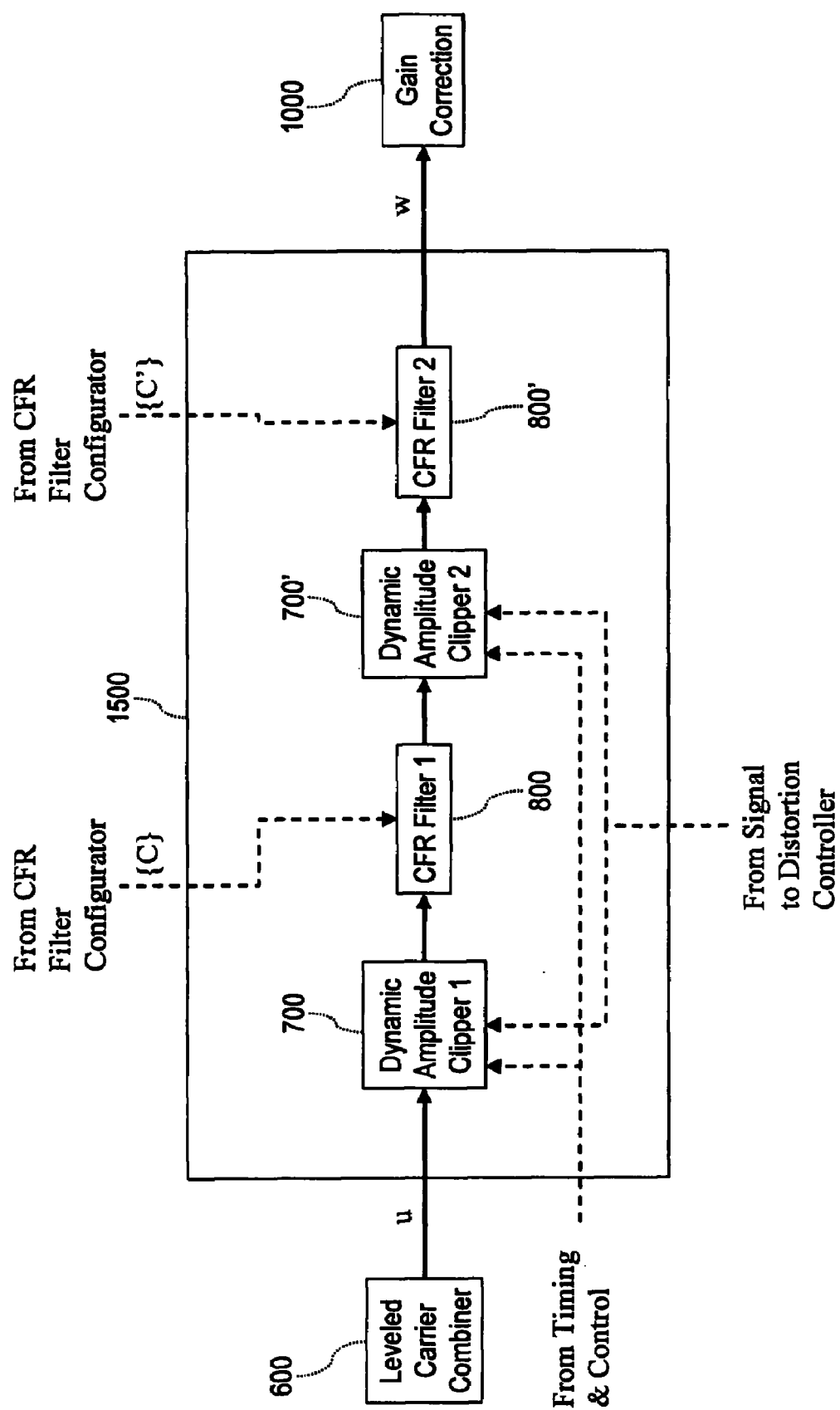
FIG. 3 shows an arrangement of Dynamic Amplitude Clippers and CFR Filters according to one embodiment of the present invention.

In one embodiment, with reference to FIG. 3, the Dynamic Amplitude Clippers 700, 700' are processes that suppress the peak amplitude of the composite transmit signal, without phase distortion. The Dynamic Amplitude Clippers can operate in either Static Mode or Dynamic Mode. In Static Mode, clipping is performed at a fixed level, regardless of the RMS level of the signal being clipped. Thus, as the signal's RMS level increases, more of the signal is clipped, and as it decreases, less of the signal is clipped. In Static Mode, the peak to average ratio of the signal will fluctuate with the RMS level of the signal. In Dynamic Mode, the ratio of the clipping level to the signal's RMS level is held constant, which leads to a constant peak to average ratio of the output signal regardless of the RMS level of the clipped signal.

Whether in Static or Dynamic Mode, this amplitude clipping function may produce both in-band and out-of-band distortion. The in-band distortion should be maintained to a desired SDR level, and the out-of-band distortion should be suppressed to below the spectrum emission mask (SEM) requirements. The Signal to Distortion Controller 1200 maintains the SDR level by setting the amplitude clipping level. The CFR Filter Configurator 900 together with the CFR filters 800, 800' suppress the out-of-band distortion.

The CFR filters can be programmable filters which perform filtering to remove the out-of-band noise. To support changing signal characteristics, the filter coefficients are generated using the CFR Filter Configurator 900.

In one embodiment, the CFR Filter Configurator 900 implements filter coefficient combiner processes that determine the filters based on the amplitude of the carriers, carrier frequencies, carrier bandwidths, filter shapes and which carriers are on or off.

The Signal to Distortion Controller 1200 monitors the signal to distortion ratio by comparing the input signal with the output signal. The SDR is computed, and a correction factor is determined, and is used to adjust the clipping thresholds in the Dynamic Amplitude Clippers 700, 700'. If the SDR is too low then the amplitude clippers' thresholds are increased to improve the SDR to the required level. For example, if the measured SDR is lower than a desired level then a correction factor larger than 1 is applied. This would increase the clipping threshold to improve the SDR to the correct level; otherwise, a factor smaller than 1 is applied, and this would reduce the clipping threshold. In this fashion, the SDR can be maintained at the desired level. The Signal to Distortion Controller 1200 can also be programmed to adjust the factor if the SDR is below the desired level, and not adjust the clipping threshold if SDR is higher than the level. Thus, the SDR Controller can prevent a small SDR while allowing fluctuations of SDR provided they remain above the desired level.

In one embodiment, the Dynamic Amplitude Clippers and CFR Filters contains back-to-back clipper/filter pairs. For example, with reference to FIG. 3, Clipper/Filter Pair 1 (i.e., clipper 700 and filter 800) performs the majority of the crest factor reduction and noise filtering. As the highly clipped signal from the first Dynamic Amplitude Clipper 700 passes through the first CFR Filter 800, the signal experiences some PAR regrowth. Clipper/Filter Pair 2 (i.e., clipper 700' and filter 800') removes some of this regrowth. Accordingly, the second Dynamic Amplitude Clipper 700' may be programmed with a slightly higher clipping level than that used in the first Dynamic Amplitude Clipper 700. The out-of-band noise introduced by the second clipper is removed with the second CFR Filter 800' coefficients, which are designed to minimize PAR regrowth due to the second filter.

Optionally included at the interfaces of each block are rate changing interpolators or decimators with the purpose of maximizing implementation efficiency.

As the result, the Carrier Processor and Crest Factor Reducer produce the multi carrier signal and provide the following features:

(1) Produces a low PAR signal;
(2) Maintains low ACPR through filtering;
(3) Maintains a desirable SDR or EVM; and
(4) Maintains performance despite signal fluctuations, power transitions, varying statistics, and carrier blanking.

COMPARATIVE EXAMPLES

FIG. 4(*a*) shows four carriers that are transmitted with different power levels. The Carrier Levelers 500 are used to adjust the carrier gain to bring all carriers' powers to the same level (see FIG. 4(*b*)). The Amplitude Clippers 700, 700' clip the signal to reduce the PAR; however this process introduces clipping noise that has approximately constant spectral density (see FIG. 4(*c*)). Hence with carrier gain applied, the signal to clipper distortion can be maintained to the desired level. In this example, the carriers have the same SDR; however different SDRs may be achieved if desired. To reverse the carrier gain, at least one of the CFR Filters 800, 800' should have the filter gain shape having the reverse gain (see FIG. 4(*d*)) so that when this filter is applied to the Amplitude Clipper or Clippers output, the resulting signal will have the same amplitude and spectral distribution as in the input (see FIG. 4(*e*)). It is noted that this signal would have the desired SDR that is due to clipping noise.

FIGS. 5(*a*), 5(*b*), 5(*c*), 5(*d*) and 5(*e*) show the signal processing according to another example when Carrier Leveling Mode is bypassed, where $g_k=1$. FIG. 5(*a*) and FIG. 5(*b*) show four carriers transmitted with different power levels. After the amplitude clipping process, the clipping noise has approximate constant spectral density (see FIG. 5(*c*)). FIG. 5(*d*) shows the filter gain shape having the same amplitude gain level. When this filter is applied, the output of the CFR filter will have the spectral shape as shown in FIG. 5(*e*). It is noted that this signal will not have equal SDR across all carriers due to clipping noise when the carriers have different amplitudes.

Transmit Modem Interface

The Transmit Modem Interface 100 provides the interface between the Communication Modem System with the Crest Factor Reduction Processor 10. This interface may be specifically designed to support the desired interface.

Carrier Processor

In one embodiment, the Carrier Processor 200 provides the functions of digital upsampling, filtering and frequency translation. The upsampling is used to increase the sample rate of the incoming signal. The filtering is used to remove the aliases caused by upsampling and to provide spectral shaping of the carrier.

Figure 6:
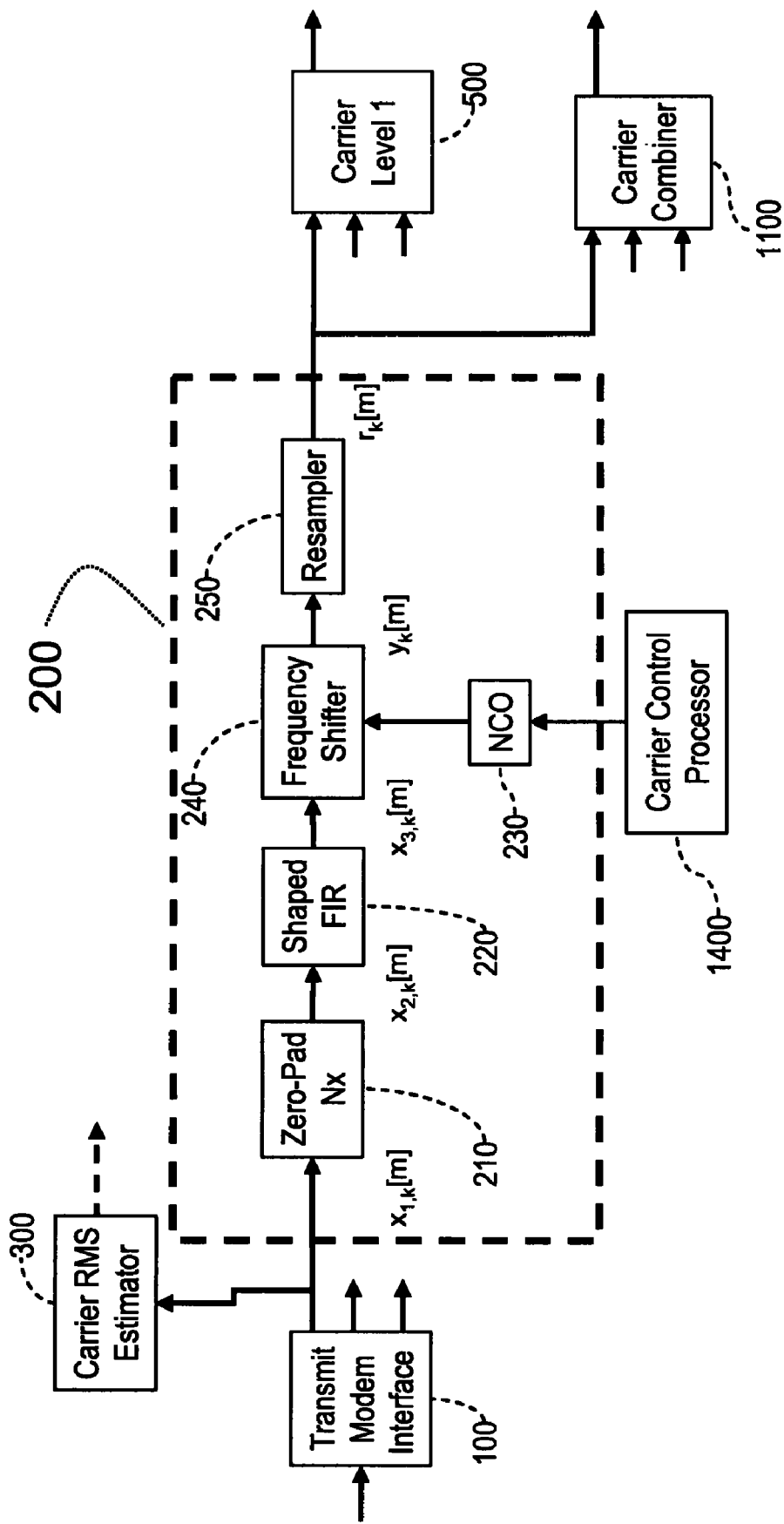
FIG. 6 is a block diagram of a Carrier Processor according to one embodiment of the present invention.

Upsampling and filtering is performed first. With reference to FIG. 6, the signal $x_{1,k}[m]=I_{1,k}[m]+jQ_{1,k}[m]$ is processed with zero-padding at processor 210 to produce the signal $x_{2,k}[m]=I_{2,k}[m]+jQ_{2,k}[m]$ that has a sampling rate of $R_2=KR_1$, where $I_{1,k}[m]$ is the in-phase component, $Q_{1,k}[m]$ is the quadrature component and $R_1$ is the sampling rate of $x_{1,k}[m]$. The resulting in-phase and quadrature-phase components of the output are then separately filtered with a shaped low pass filter, Shaped FIR 220, to produce the signal $x_{3,k}[m]$ $$x_{3,k}[m] = I_{3,k}[m] + jQ_{3,k}[m] \qquad (1)$$
$$= \sum_{i=0}^{L_1-1} c_i I_{2,k}[m-i] + j\sum_{i=0}^{L_1-1} c_i Q_{2,k}[m-i]$$

where $c_i$ are the coefficients of the shaped filter. The filter has a low pass response and the coefficients $c_i$ are symmetric. Thus, the signal $I_{2,k}[m]$ and $Q_{2,k}[m]$ can be pre-summed before filtering to reduce the number of multiplications. Additional upsampling and filtering can be performed by cascading multiple zero-pad and filtering operations.

After the signals $I_{3,k}[m]$ and $Q_{3,k}[m]$ are sufficiently upsampled and filtered, they are then frequency shifted with the Frequency Shifter 240 to the desired carrier IF frequency as follows:

$$y_k[m]=\{I_{3,k}[m]+jQ_{3,k}[m]\}\{\cos(2\pi f_k m/T+\phi_k)+j\sin(2\pi f_k m/T+\phi_k)\} \qquad (2)$$

where $f_k$ is the carrier IF frequency, T is the sample period, $\cos(2\pi f_k m/T+\phi_k)+j\sin(2\pi f_k m/T+\phi_k)$ are the outputs of the numerically controlled oscillator (NCO) 230 and $\phi_k$ are phase offsets of each channel.

If all carriers have the same modulation, then all the Carrier Processors 200 would be the same in structure, but if the carriers are different then the Carrier Processors 200 would have different up-sampling and filter coefficients, and a Resampler 250 may be required to provide the N carriers with the same sampling rate prior to combining the individual carriers into a single signal. Each carrier processor's Resampler resamples at the rate appropriate for the input signal $y_k[m]$ to produce $r_k[m]$ such that all $r_k[m]$ across all Carrier Processors 200 are at the same sample rate.

Carrier RMS Estimator

Figure 7:
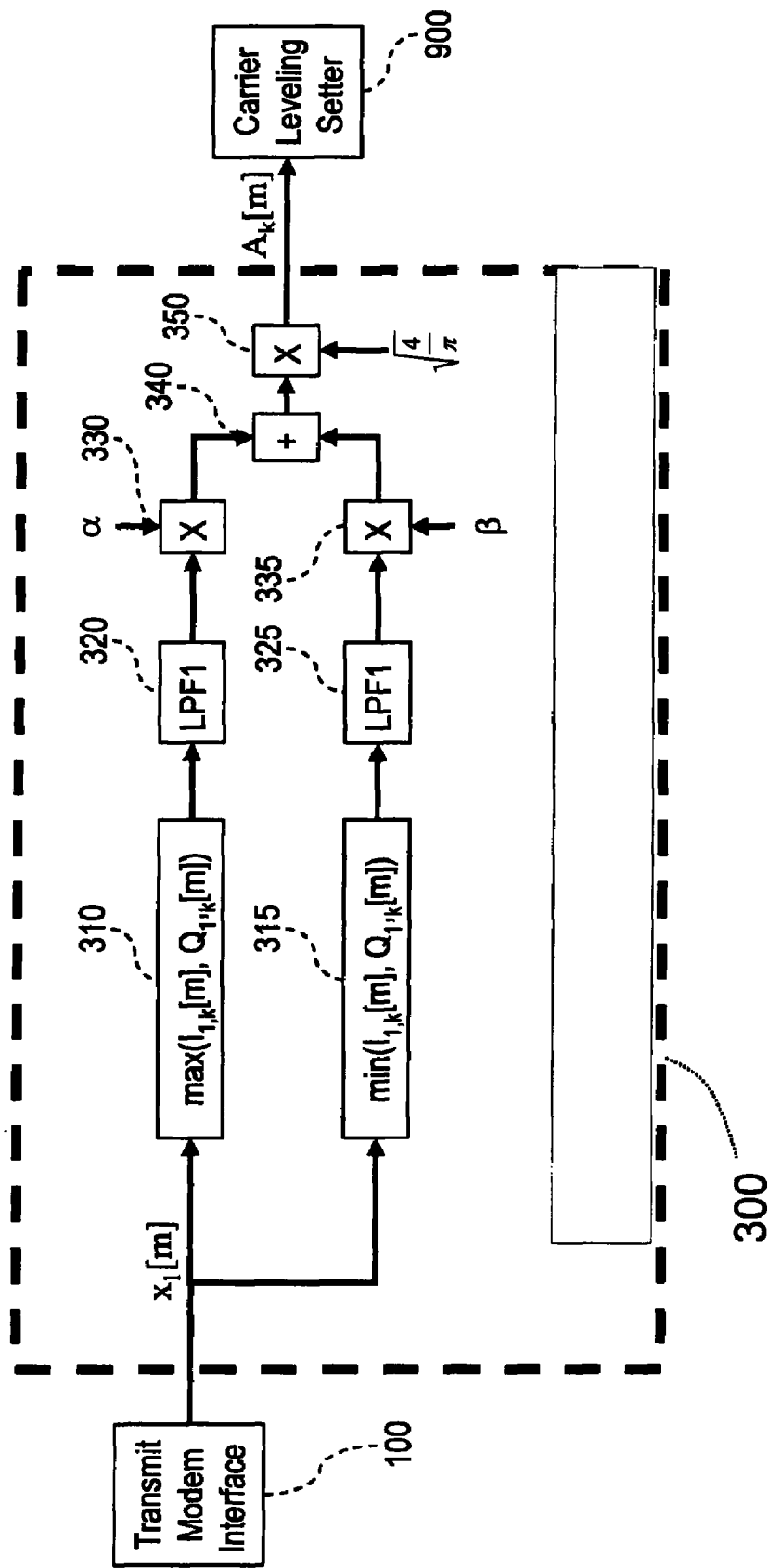
FIG. 7 is a block diagram of a Carrier RMS Estimator according to one embodiment of the present invention.

With reference to FIG. 7, in one embodiment, the Carrier RMS Estimator 300 estimates the carrier powers of the individual carriers $\{C_1, C_2, C_3, \ldots, C_N\}$ to produce the RMS amplitude of the carriers $\{A_1, A_2, A_3, \ldots, A_N\}$. The equation, $$A_k = \sqrt{LPF(I_{1,k}^2[m]) + LPF(Q_{1,k}^2[m])} \sim \sqrt{\frac{4}{\pi} LPF\{\alpha \cdot \max(I_{1,k}[m], Q_{1,k}[m]) + \beta \cdot \min(I_{1,k}[m], Q_{1,k}[m])\}} \quad (3)$$

where $\alpha$ and $\beta$ are constants chosen to provide a good estimate of the magnitude $A_k$ provides the definition of the RMS amplitude estimator and the complexity-saving approximations employed with reference to FIG. 7. The constants $\alpha$ and $\beta$ may be chosen to allow the multipliers 330, 335 to be implemented with simple shifts and adds. The multiplier 350 may be omitted when the absolute value of $A_k[m]$ is not required.

Figure 8:
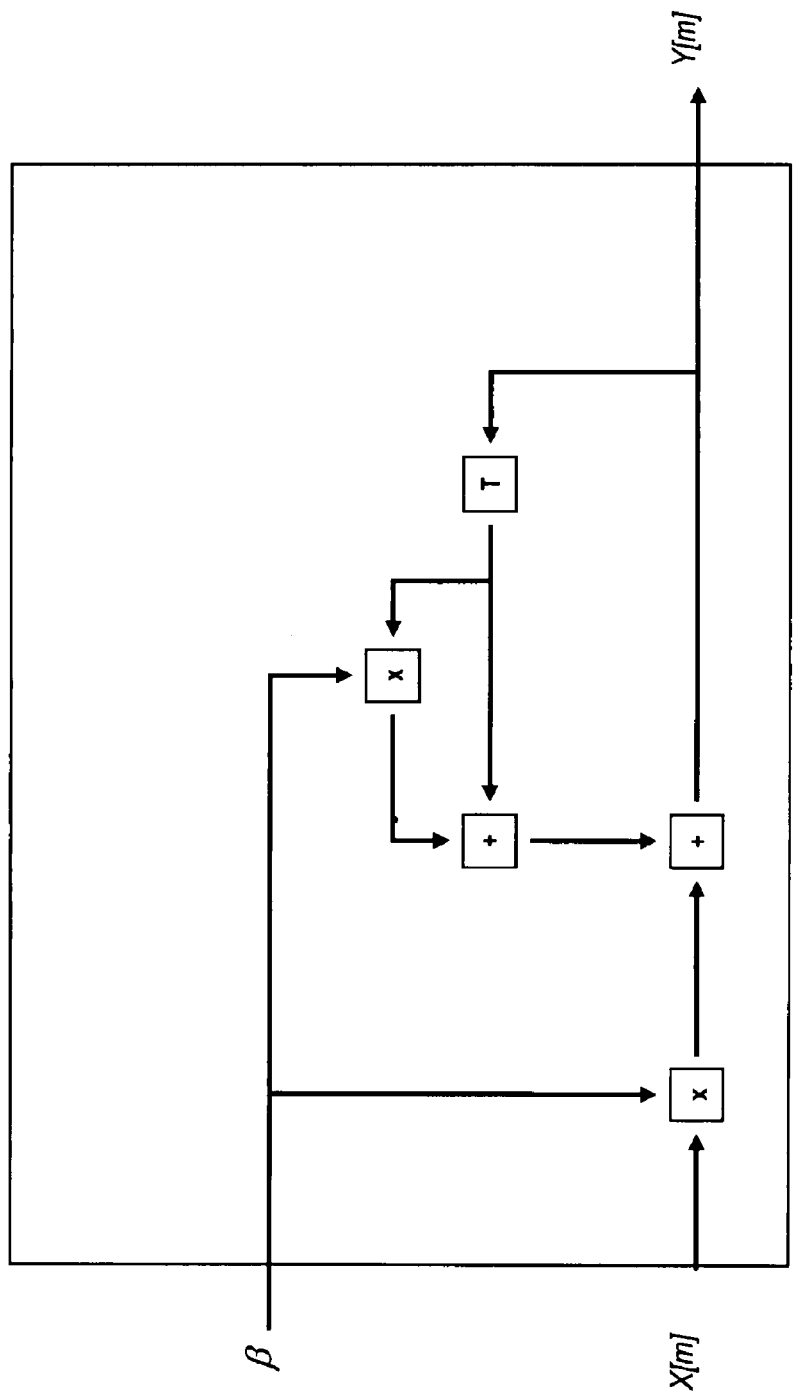
FIG. 8 is a block diagram of an infinite impulse response (IIR) filter according to one embodiment of the present invention.

With reference to FIG. 8, the LPF can be implemented using an integrate-and-dump filtering over L samples, or an infinite impulse response filter (IIR) having a transfer function $$H(z) = \frac{\beta}{1 - (1-\beta)z^{-1}} \quad (4)$$

where $\beta$ is a filter bandwidth control parameter that is much less than 1.

The time constant for the IIR filter is $1/\beta R_s$. If $\beta$ is set small then the IIR converges slowly but has good accuracy, and if $\beta$ is large then the IIR converges rapidly but has low accuracy due to the variation of the signal. If $\beta$ is conveniently set to $2^{-k}$, where k is some integer, then the IIR multipliers can be replaced by bit shifters.

Carrier Leveling Setter

An aspect of the Carrier Leveling Setter 400 is to determine the gains $1/g_1, 1/g_2, \ldots, 1/g_N$ that are applied at the Carrier Levelers 500 for N carriers, and the gains $g_1, g_2, \ldots, g_N$ that are applied at the CFR Filter Configurator 900.

When the Dynamic Amplitude Clippers 700, 700' are applied, the distortion is distributed over all carriers, and the distortion's spectral density is approximately a constant over the carriers. Therefore if a carrier is strong, the signal to distortion (SDR) for this carrier is high, and if the carrier is weak, the SDR for this carrier is low. In practice each carrier type has a specific SDR, and the SDR for different signals can be different.

Table 1 shows the case where Carrier Leveling is disabled, and no gain is applied to the individual carriers.

TABLE 1

Example SDR margin for when the Carrier Level is not used

| Carrier # | Carrier Type | Transmitted Power (dBm) | Bandwidth (MHz) | Signal Density (dBm/Hz) | Clipper Distortion Density (dBm/Hz) | SDR (dB) | Required SDR (dB) | SDR Margin (dB) |
|---|---|---|---|---|---|---|---|---|
| 1 | cdma2000 | 37 | 1.25 | −23.97 | −46.79 | 22.82 | 18 | 4.82 |
| 2 | WCDMA | 40 | 4 | −26.02 | −46.79 | 20.77 | 20 | 0.77 |
| 3 | OFDM | 40 | 5 | −26.99 | −46.79 | 19.80 | 30 | −10.20 |
|   | Total Power | 43.98 |   |   |   |   |   |   |

According to this example, the cdma2000 has 4.8 dB SDR margin, WCDMA meets the required margin, and the OFDM has −10.2 dB margin. The different signal powers and the constant distortion power produces a SDR imbalanced design.

Table 2 shows the case where Carrier Leveling mode is enabled, and desirable gains are applied to the individual carriers.

TABLE 2

Example SDR margin for when the Carrier Level is used

| Carrier # | Carrier Type | Transmitted Power (dBm) | Bandwidth (MHz) | Carrier Gain i.e., 1/gk (dB) | Leveled Power (dB) | Signal Density (dBm/Hz) | Clipper Distortion Density (dBm/Hz) | SDR (dB) | Required SDR (dB) | SDR Margin (dB) |
|---|---|---|---|---|---|---|---|---|---|---|
| 1 | cdma2000 | 37 | 1.25 | −5.00 | 32.00 | −28.97 | −47.03 | 18.07 | 18 | 0.07 |
| 2 | WCDMA | 40 | 4 | −1.00 | 39.00 | −27.02 | −47.03 | 20.01 | 20 | 0.01 |
| 3 | OFDM | 40 | 5 | 10.00 | 50.00 | −16.99 | −47.03 | 30.05 | 30 | 0.05 |
|   | Total Power | 43.98 |   | Leveled Power | 50.40 |   |   |   |   |   |

According to this example, the cdma2000 has 0.07 dB SDR margin, WCDMA has 0.01 dB SDR margin and the OFDM has 0.05 dB margin. This is clearly an SDR-balanced design, where all carriers meet the SDR requirements.

As shown in the above example, the individual carriers may have to be adjusted in amplitude so that the Crest Factor Reduction has lowest PAR while meeting all carriers' SDR requirements.

The following steps can be followed to compute Carrier Gains to provide for equal SDR margin.

(1) Compute the power level, $P_n$, of each carrier.

(2) Compute the power spectral density, $S_n = P_n/B_n$, of each carrier where $B_n$ is the signal bandwidth.

(3) Determine the relationships between $g_k$ such that $$\frac{S_k}{g_k^2 SDR_{req,k}} = D(K_L, P_{tot}) \quad (5)$$
$$= D$$

where $SDR_{req,k}$ is the SDR required for carrier k to maintain good EVM performance and $D(K_L, P_{tot})$ is the total distortion power spectral density, which is a function of the clipping level, $K_L$ and the total signal power, $P_{tot}$, entering the first Dynamic Amplitude Clipper 700. The distortion power spectral density is approximately a constant, D, for all k.

(4) If the value for D is not known, scale all $g_k$ found in the previous step such that the desired signal to distortion ratio for all carriers meets the desired level.

Carrier Levelers

In one embodiment, the Carrier Levelers 500 multiply the gain values $1/g_1[m], 1/g_2[m], \ldots, 1/g_N[m]$ from Block 400 with the signals $r_1[m], r_2[m], \ldots, r_N[m]$ to produce the signals $z_1[m], z_2[m], \ldots, z_N[m]$.

$$z_k[m] = \frac{1}{g_k[m]} r_k[m] \quad (6)$$

The values of $g_k[m]$ may change as the waveform changes.

Leveled Carrier Combiner

The Leveled Carrier Combiner 600 coherently combines the carriers (separately in-phase and quadrature-phase) as follows $$u[m] = I_u[m] + jQ_u[m] = \sum_{k=1}^{N} z_k[m]. \quad (7)$$

The resulting signal is a multi carrier signal with the individual carriers amplitude adjusted.

Carrier Combiner

The Carrier Combiner 1100 coherently combines the carriers (separately in-phase and quadrature-phase) as follows $$s[m] = I_s[m] + jQ_s[m] = \sum_{k=1}^{N} y_k[m] \quad (8)$$

The resulting signal is a multi carrier signal with the individual carriers not amplitude adjusted.

Dynamic Amplitude Clippers

An aspect of the Dynamic Amplitude Clippers 700, 700' is to limit the amplitude without distorting the phase of the signal, u[m], in a fashion that maintains the desired signal to distortion ratio even when the signal's statistics are changing.

Figure 9:
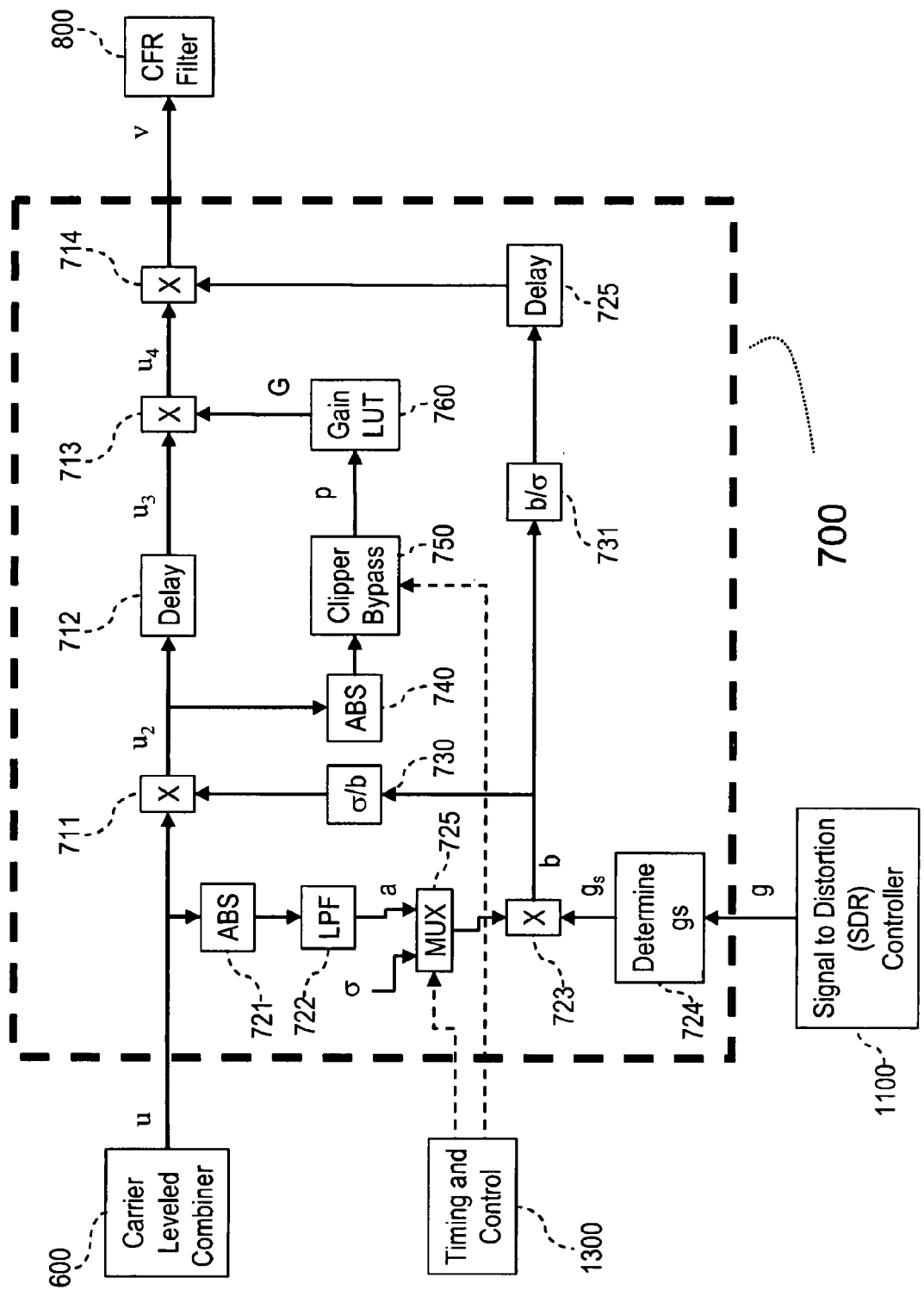
FIG. 9 is a block diagram of a Dynamic Amplitude Clipper according to one embodiment of the present invention.

With reference to FIG. 9, in one embodiment, the processing steps for the Dynamic Amplitude Clippers are as follows:

(1) Compute the amplitude of signal u[m] (Block 721).

(2) Perform low pass filtering (LPF) (Block 722) of the amplitude of signal u[m] to estimate the signal envelope a[m]. This filter can be implemented with an IIR (e.g., recursive filter $$H(z) = \frac{\beta}{1 - (1-\beta)z^{-1}}).$$

The filter coefficient β determines the time response of the signal envelope in dynamic signal conditions.

(3) Instruct the Dynamic Amplitude Clippers to operate in static or dynamic clipping mode. For static clipping mode, Timing and Control Block 1300 selects the Mux 725 to pass value θ to the multiplier 723. For dynamic clipping mode, Timing and Control Block 1300 selects the Mux 725 to pass the signal envelope a[m] to the multiplier 723.

(4) Adjust gain (or gain value) $g_s$ to maintain the desired SDR or to otherwise control the SDR. This is achieved without requiring the Gain look-up table (LUT) regeneration by effectively adjusting the clipping threshold described in step 8 below.

Based on the gain correction value g[m] as produced by the Signal to Distortion (SDR) Controller 1200, the processor determines the gain value $g_s$. This $g_s$ effectively is the amount of adjustment on the threshold of the clipper. If $g_s>1$ then the threshold is effectively increased to relax the clipping. If $g_s<1$, then the threshold is effectively reduced to force more clipping. Here, the Gain LUT physically remains constant; the signal is raised or lowered instead.

Figure 10:
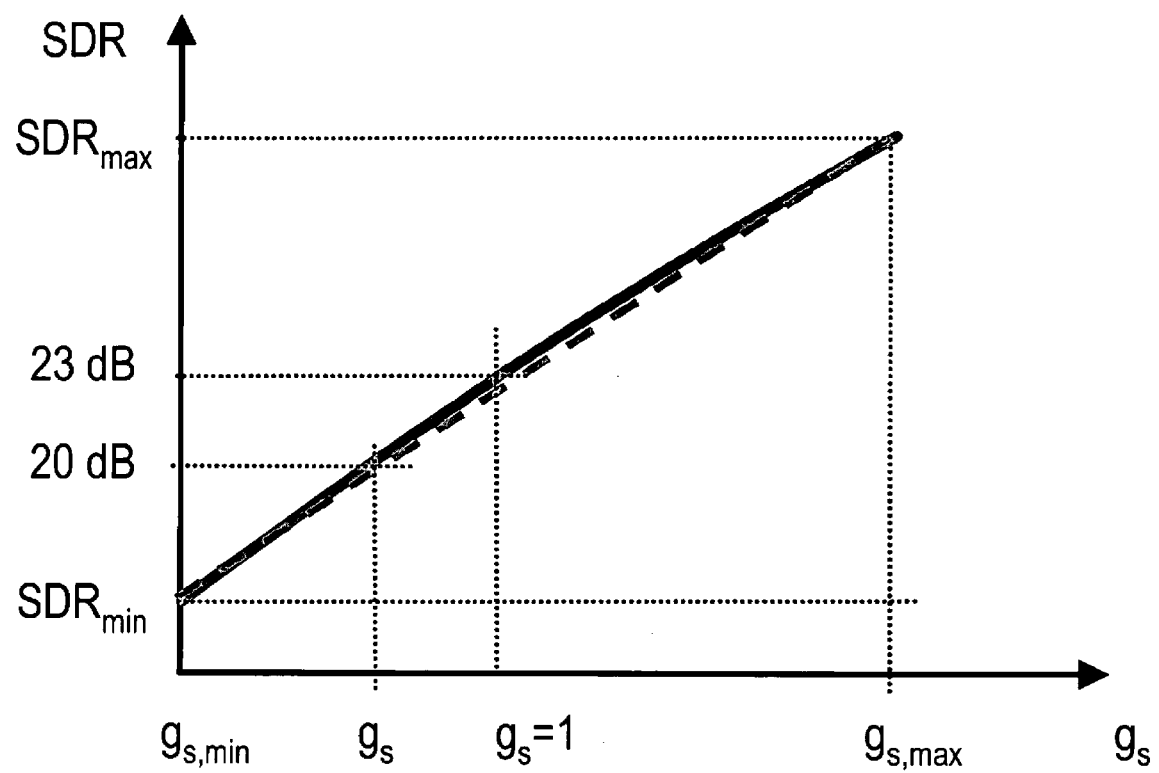
FIG. 10 is a graph showing signal to distortion ratio (SDR) versus gain (or gain value) $g_s$.

FIG. 10 illustrates the effect of the gain value $g_s$ versus the SDR. In this example, the measured SDR is 23 dB but the PAR is 7 dB, and it is desirable for the system to reduce the PAR while maintaining SDR>20 dB. To support this, the gain, $g_s$, can be decreased by a small value so that the signal is effectively clipped harder to reduce the SDR to 20 dB and, as a result, to reduce the PAR.

To prevent the situation of excessive clipping, the gain value $g_s$ produced at the output of determining unit 724 may be the larger of $g_s$, with reference to FIG. 10, and a preset threshold $g_T$. A method to compute $g_s[m]$ is as follows $$g_s[m] = \max\left\{g_T, g_{s,min} + \frac{g_{s,max} - g_{s,min}}{SDR_{max} - SDR_{min}}(SDR[m] - SDR_{min})\right\}. \quad (9)$$

Here, as in FIG. 10, the relationship between SDR and $g_s$ is approximated with a linear equation.

(5) Multiply at multiplier 723 signal envelope a[m] with $g_s$ to produce signal b[m].

(6) Compute the signal 1/b[m] at computing unit 730 and multiply it with signal u[m] to produce signal $u_2[m]$ at multiplier 711.

(7) Compute amplitude of signal $u_2[m]$ at unit 740.

(8) Bypass the clipper if necessary. When the Timing and Control unit 1300 sends a command to employ the Clipper Bypass mode, the Clipper Bypass Processor 750 replaces the amplitude with zero over a specified duration.

$$p[m] = |u_2[m]|; \text{ normal clipping operation} \quad (10)$$
$$= 0; \text{ if } T/C \text{ controller commands clipper bypass} \quad (11)$$

Figure 11:
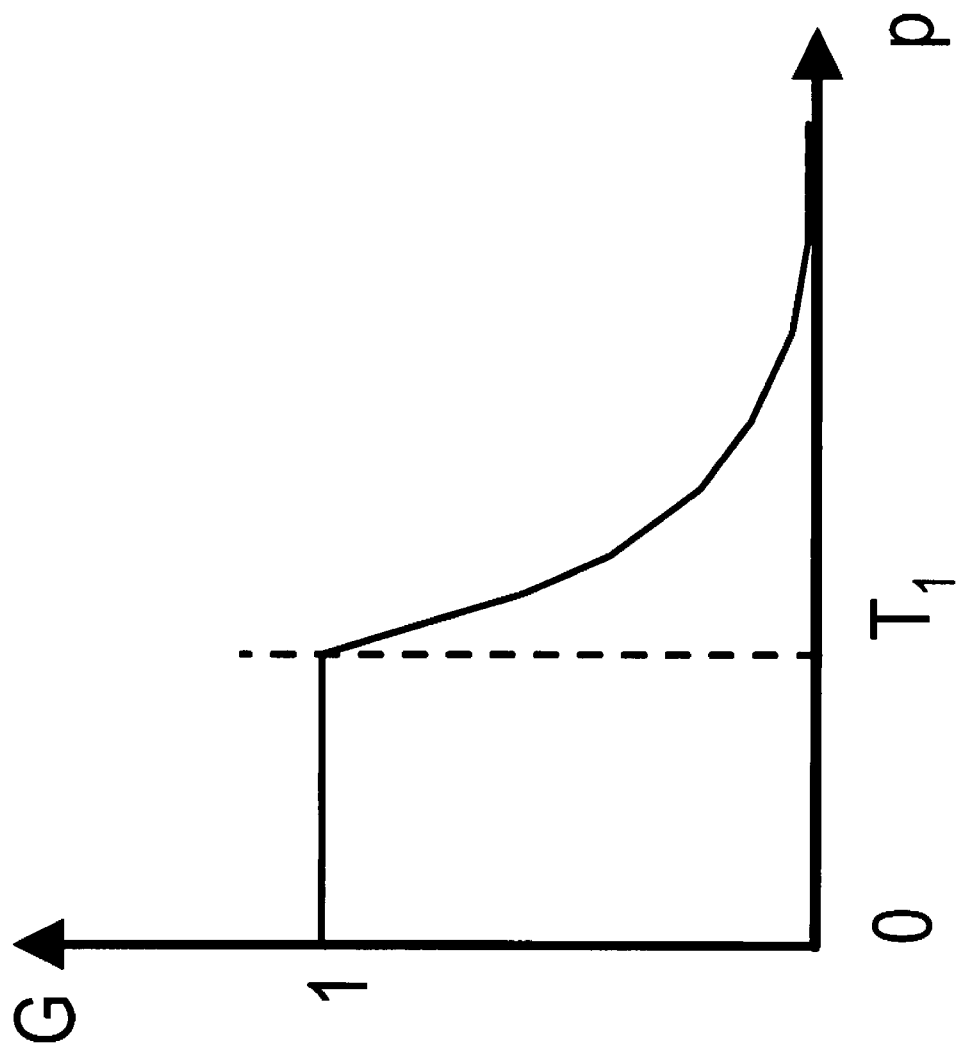
FIG. 11 is a graph showing values of a Gain look-up table (LUT) according to an embodiment of the present invention.

(9) Send the amplitude p[m] to a Gain LUT 760. The output of the LUT is a function of the input amplitude $$G[m] = T_1/p[m]; \quad p[m] > T_1 \quad (12)$$
$$= 1; \quad \text{otherwise,}$$

where $T_1$ is the clipping level of the signal. Here, with reference to FIG. 11, when the T/C Controller commands Clipper Bypass mode, the amplitude is zero, the Gain LUT 760 will output unity and no clipping will be applied. This allows the signal to skip the clipping to produce a high PAR signal.

(10) Delay the signal $u_2$ [m] at delay unit 712 to produce the signal $u_3$ [m]=$u_2$[m−$\tau_1$] that is aligned in time with gain G. The signal $u_3$ [m] is multiplied at multiplier 713 with the gain G to produce signal $u_4$ [m]. This effectively processes the clipping of the signal amplitude.

(11) Delay at delay unit 725 signal b[m] to produce signal b[m−$\tau_2$] to compensate for the signal delay in the main path.

(12) Multiply at multiplier 714 the signal $u_4$ [m] with signal b[m−$\tau_2$] to produce signal v[m]. Signal v[m] is the amplitude clipped version of signal u[m].

Crest Factor Reduction (CFR) Filter

The transmitted signal can be a combination of multiple carriers, and thus the spectrum can be asymmetric. In these applications multiple bandpass filters can be designed, one for each carrier, followed by a filter combination process to realize the combined filter with a single filter as engaged in the CFR Filters 800, 800'. For example, let v[m]=$I_i$[m]+$jQ_i$ [m] be the input signal of the filter. The output of the filter can be expressed as $$w[m] = I_0[m] + jQ_0[m] \quad (13)$$
$$= \{I_i[m] + jQ_i[m]\} * c[m]$$
$$= \{I_i[m] + jQ_i[m]\} *$$
$$\{h_1[m] \cdot e^{j\omega_1 \frac{m}{T}} + h_2[m] \cdot e^{j\omega_2 \frac{m}{T}} + \ldots + h_{N_c}[m] \cdot e^{j\omega_{N_c} \frac{m}{T}}\}$$
$$= \{I_i[m] + jQ_i[m]\} *$$
$$\left\{ \begin{array}{l} h_1[m] \cdot \cos\left(\omega_1 \frac{m}{T}\right) + h_2[m] \cdot \cos\left(\omega_2 \frac{m}{T}\right) + \ldots + \\ h_{N_c}[m] \cdot \cos\left(\omega_{N_c} \frac{M}{T}\right) + \\ j\left[h_1[m] \cdot \sin\left(\omega_1 \frac{m}{T}\right) + h_2[m] \cdot \sin\left(\omega_2 \frac{m}{T}\right) + \ldots + \right. \\ \left. h_{N_c}[m] \cdot \sin\left(\omega_{N_c} \frac{m}{T}\right)\right] \end{array} \right\}$$

where * indicates the convolution process, $$x[m] * y[m] = \sum_{i=1}^{N_c} x(t)y(i-t) \quad (14)$$

and $h_i$[m] is the lowpass version of the desired filter for carrier i, and $\omega_i$ is the angular frequency of the carrier to be passed through filter $h_i$[m]. The filters $h_i$[m] can have different spectral shapes. The input ($I_i$[m]+$jQ_i$[m]) and output ($I_o$[m]+$jQ_o$ [m]) relationship of the filter is expressed as $$I_o[m] + jQ_o[m] = \{I_i[m] + jQ_i[m]\} * c[m] \quad (15)$$
$$= \{I_i[m] + jQ_i[m]\} * \{c_c[m] + jc_s[m]\}$$

and $$c[m] = c_c[m] + jc_s[m] \quad (16)$$

$$c_c[m] = h_1[m] \cdot \cos\left(\omega_1 \frac{m}{T}\right) + \quad (17)$$
$$h_2[m] \cdot \cos\left(\omega_2 \frac{m}{T}\right) + \ldots + h_{N_c}[m] \cdot \cos\left(\omega_{N_c} \frac{m}{T}\right)$$

$$c_s[m] = h_1[m] \cdot \sin\left(\omega_1 \frac{m}{T}\right) + \quad (18)$$
$$h_2[m] \cdot \sin\left(\omega_2 \frac{m}{T}\right) + \ldots + h_{N_c}[m] \cdot \sin\left(\omega_{N_c} \frac{m}{T}\right)$$

In one embodiment, the process is to compute the filter $h_i$[m], shift it to the desired frequency $\omega_i$, and then combine in the above fashion to form the single complex filter c[m].

Figure 12:
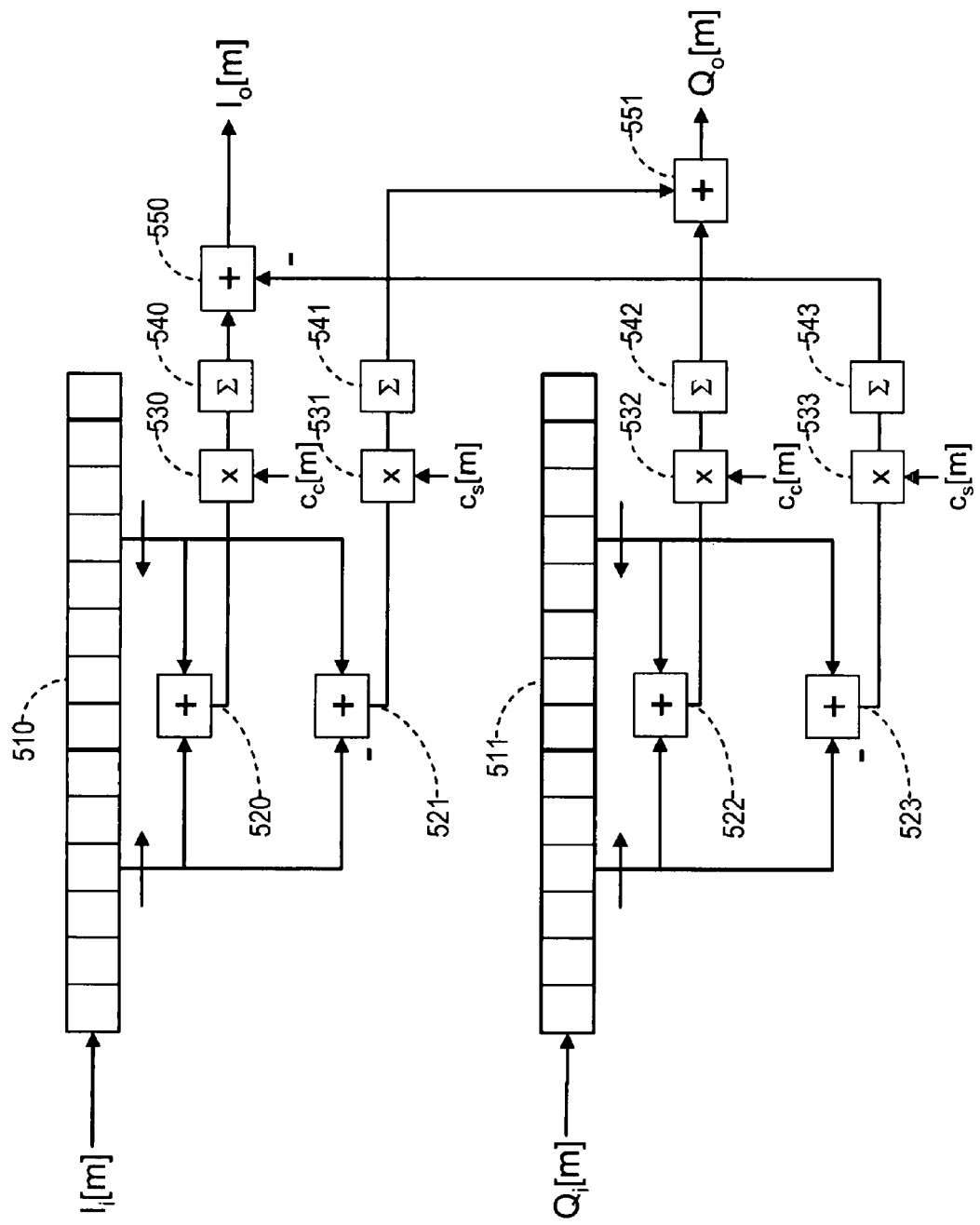
FIG. 12 shows a CFR filter according to one embodiment of the present invention.

One embodiment of a CFR filter structure is shown in FIG. 12. The real and imaginary parts of the input signal $I_i$[m]+$jQ_i$ [m] are passed through tapped delay lines 510 and 511, respectively, of length M, selected to support the filter $h_i$[m]'s spectral requirements. Since the taps of $c_c$[m] are even symmetric and the taps of $c_s$[m] are odd symmetric, pre-summing of the data in the tapped delay line is possible. Thus, the samples at the taps are fed to two summers: the adding summer 520, corresponding to c[m], and the subtracting summer 521, corresponding to c[m]. The outputs of these summers are passed to two multipliers 530 and 531 that form the products of the pre-summed signal and the filter coefficients. Since the signal is processed in this fashion, the number of multiplications required is decreased by a factor of two. To reduce the amount of hardware required to realize this filter, the pre-summing adders and multipliers may be shared across many taps. Thus, as the inputs to the adders sweep across the taps, the M/2 coefficients are changed and the multipliers' outputs are combined with summers 540 and 541. The $Q_i$[m] signal is processed with identical circuitry. The output from the $I_i$[m] filter side and the $Q_i$[m] filter side are combined with adders (Blocks 550 and 551) to produce $I_o$[m] and $Q_o$[m].

If the desired signal is symmetric over the origin (e.g., 0 Hz), then the filter is real. In that case $c_s$[m]=0 and only the filtering corresponding to $c_c$[m] is required. In this situation, the complexity of the filter is cut in half.

Depending on the spectral shapes of the filters $h_i$[m], the composite filter, c[m], may have spectral regions of excessive attenuation where the edges of the passbands of adjacent filters meet. This attenuation may degrade signal quality and increase the peak to average ratio of the transmitted signal. To improve performance, the attenuation may be removed by inserting nibble filters. Nibble filters may be implemented with the same (or substantially the same) hardware used for the noise suppression filters. Their generation is described below and illustrated in FIG. 15. For a system with $N_c$ carriers, there may be as many as $N_c$−1 nibble filters.

In one embodiment, nibble filter coefficients are determined by computing the difference of an ideal filter response, i.e., one without the offending attenuation, and the response of the composite filter, c[m], in the vicinity of the attenuation. Separate nibble filters should be created for each area of undesired attenuation. In this way, nibble filters may be added or removed as neighboring filters, $h_i$[m], are added or removed.

Including the nibble filters, $g_i[m]$, the expressions for $c_c[m]$ and $c_s[m]$ become $$c_c[m] = \qquad (19)$$
$$h_1[m] \cdot \cos\left(\omega_1 \frac{m}{T}\right) + h_2[m] \cdot \cos\left(\omega_2 \frac{m}{T}\right) + \ldots + h_{N_C}[m] \cdot \cos\left(\omega_{N_C} \frac{m}{T}\right) +$$
$$g_1[m] \cdot \cos\left(\gamma_1 \frac{m}{T}\right) + g_2[m] \cdot \cos\left(\gamma_2 \frac{m}{T}\right) + \ldots + g_{N_C}[m] \cdot \cos\left(\gamma_{N_c-1} \frac{m}{T}\right)$$

$$c_s[m] = \qquad (20)$$
$$h_1[m] \cdot \sin\left(\omega_1 \frac{m}{T}\right) + h_2[m] \cdot \sin\left(\omega_2 \frac{m}{T}\right) + \ldots + h_{N_C}[m] \cdot \sin\left(\omega_{N_C} \frac{m}{T}\right) +$$
$$g_1[m] \cdot \sin\left(\gamma_1 \frac{m}{T}\right) + g_2[m] \cdot \sin\left(\gamma_2 \frac{m}{T}\right) + \ldots + g_{N_C}[m] \cdot \sin\left(\gamma_{N_c-1} \frac{m}{T}\right)$$

where $\gamma_i$ is the frequency necessary to place the nibble filters at the correct frequency.

CFR Filter Configurator

An aspect of the CFR Filter Configurator 900 is to compute the set [C] of $N_c$ complex passband coefficients and $N_n$ complex nibble coefficients that are best used for the CFR Filter 800, 800'. The passband coefficients form the passbands for each carrier. The $N_c$ complex passband coefficients are mutually orthogonal, i.e., an amplitude change on one frequency does not affect other frequencies. The nibble coefficients fill in the gaps in the filter response created when frequency-contiguous passband filters are added together.

Because the carriers will be changing quickly, these coefficients should be computed rapidly to adapt.

The transmission consists of $N_c$ carriers, each carrier requiring a filter centered at frequency $f_k$, having an amplitude gain $g_k$, bandwidth $B_k$, a transition bandwidth of $\Delta f_k$ and rejection attenuation of $R_k$ in decibels. The number of filter coefficients could be computed as $$L = \operatorname*{Max}_k \left( \left(\frac{f_s}{\Delta f_k}\right) \left(\frac{R_k}{22}\right) \right) \qquad (21)$$

The filter design task is simplified if the $N_c$ carriers have M different types of signals, where each type has the same signal bandwidth, transition bandwidth, and rejection attenuation. In that case, M basic filters of length L can be configured.

Figure 13:
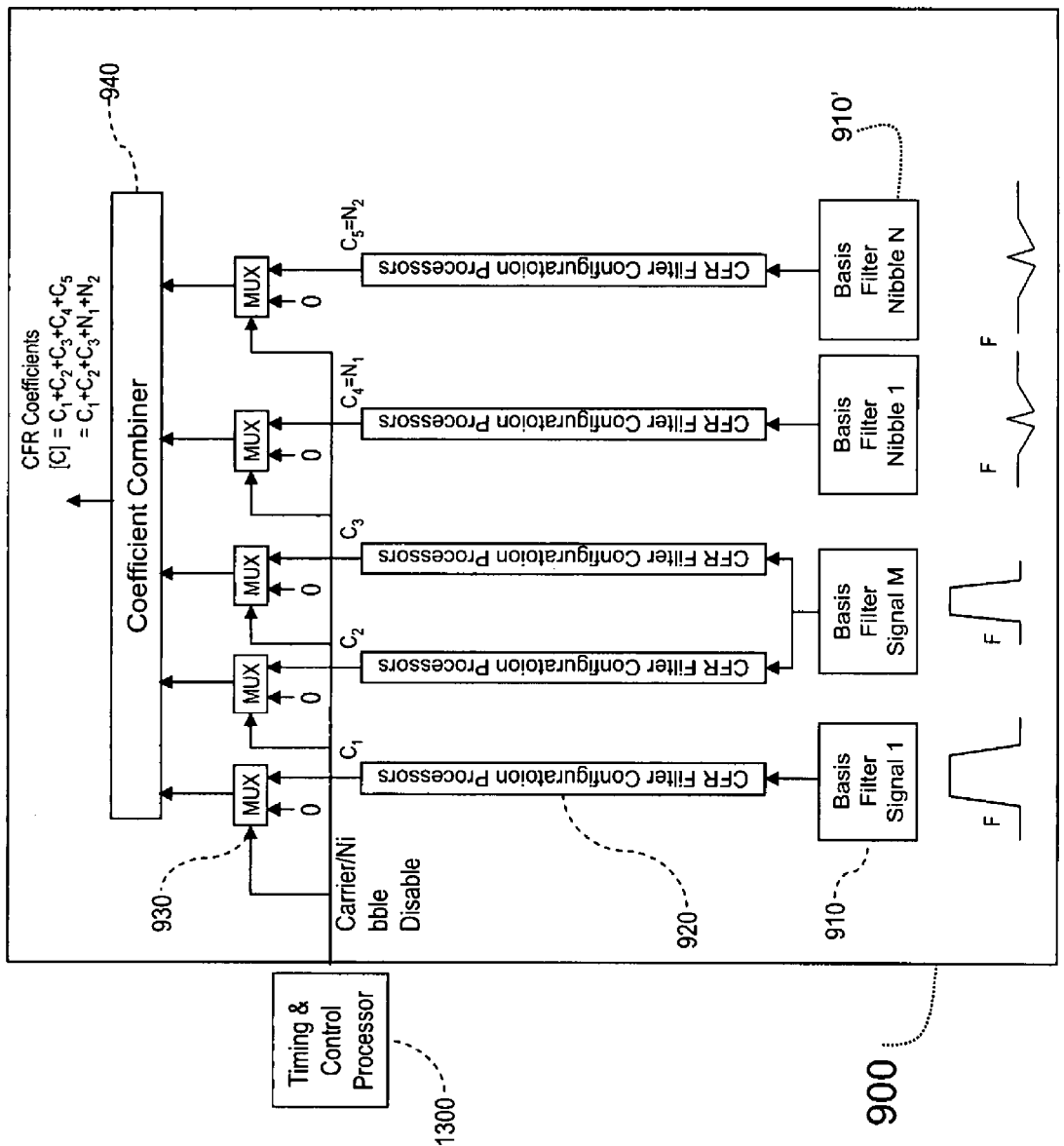
FIG. 13 is a block diagram of a CFR Filter Configurator according to one embodiment of the present invention.
Figure 14:
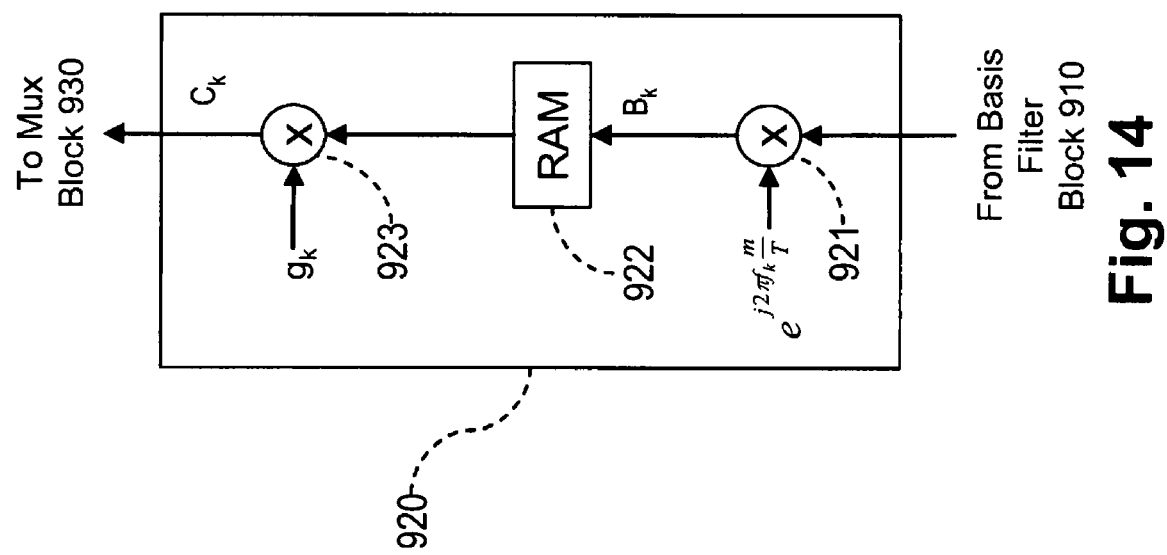
FIG. 14 is a block diagram of a CFR Filter Configuration Processor according to one embodiment of the present invention.

With reference to FIGS. 13 and 14, the processing steps for the CFR Filter Configurator are as follows:

(1) Compute the basic passband filters of the M types of signals. The filter coefficients are stored in the Basic Filter RAM 910. This process is described in the Basic Filter and Nibble Generation section below.

(2) Compute the basic nibble filters. The filter coefficients are stored in the RAM 910. This process is described in the Basic Filter and Nibble Generation section below.

(3) With reference to FIG. 14, the passband and nibble filter coefficients are frequency-shifted at shifter and scaler 921 to the correct frequencies $\{f_1, f_2, \ldots \}$. The frequencies are provided from the Carrier Processor Controller 1400.

(4) The coefficients of the frequency-shifted filters are stored in RAMs 922 for rapid processing.

(5) The coefficients for the filters from the RAM are multiplied at multipliers 923 with the gains $g_1, g_2, \ldots, g_{N_C}$ to compensate for the carrier leveling process. The gains $g_k$ are provided by the Carrier Leveling Setter 400.

(6) Let m be the index of the nibble filter corresponding to neighboring passband filters k and k+1. If the ratio of the gains exceeds a threshold, $$1/T > g_k/g_{k+1} \text{ or } g_k/g_{k+1} > T$$

the gain value, $g_m$, for the corresponding nibble filter is set to zero. Otherwise, $g_m$ may be set to unity. In a dynamic signal environment, these ratio tests should be recomputed when the gains are changed.

(7) A MUX 930 is used to set the filter coefficients of carrier k to zero when Timing and Control unit 1300 sends an interrupt to indicate carrier k is not transmitted. When a carrier is not present, Timing and Control will also turn off the corresponding nibble filters.

(8) The filter coefficients from all carriers are linearly combined in the Coefficient Combiner 940 as $$C = \{ c(1) \quad c(2) \quad \cdots \quad c(L) \} \qquad (22)$$
$$= \left\{ \sum_{k=1}^{N_C+N_N} c_k(1) \quad \sum_{k=1}^{N_C+N_N} c_k(2) \quad \cdots \quad \sum_{k=1}^{N_C+N_N} c_k(L) \right\}$$

where $c_k(i)$ is the $i^{th}$ element passband or nibble filter coefficient of the $k^{th}$ carrier or nibble, $N_c$ is the number of passband filters, $N_N$ is the number of nibble filters, L is the number of taps for the carrier filters. Also, c(i) is the $i^{th}$ element filter coefficient of the CFR filter.

(9) The filter coefficients $\{c(1), c(2), \ldots, c(L)\}$ are sent to the CFR Filters 800, 800 to remove the out of band distortion.

Basic and Nibble Filter Generation

An aspect for the Basic Filter Generator 910 is to produce a filter with very small in-band ripple, high out-of-band rejection, and while meeting transition bandwidth requirements. Any valid technique can be used to generate these filter coefficients.

Figure 15:
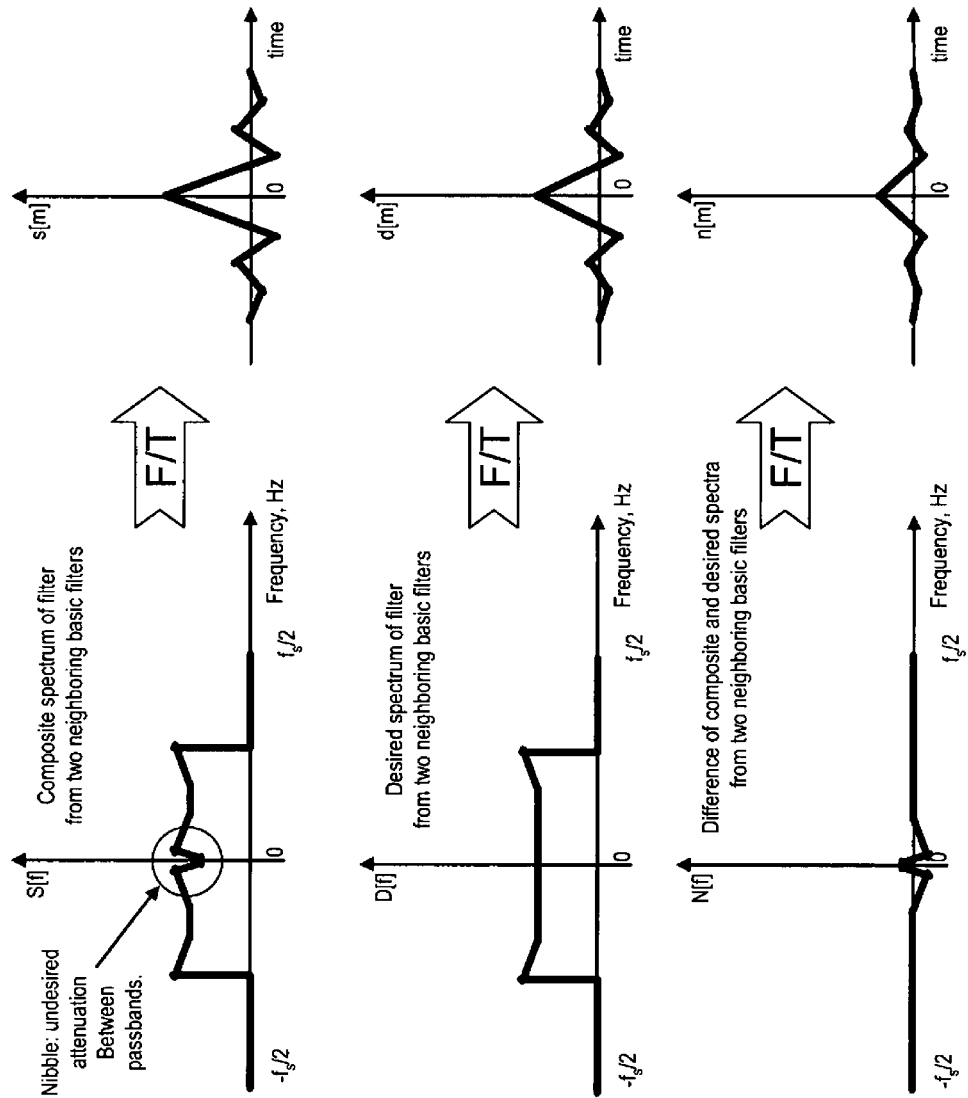
FIG. 15 shows a processing sequence of Nibble Filter Generation according to one embodiment of the present invention.

An aspect for the Nibble Filter Generator 910' is to produce a compensating filter to fill in the gaps in the filter response created when frequency-contiguous passband filters are added together. FIG. 15 illustrates the generation of Nibble Filters in one embodiment of the present invention. First, frequency-contiguous filter pairs are combined to produce the coefficients $s_k[m]$. Next, the desired filter response for this pair is computed to produce the coefficients $d_k[m]$. Finally, the difference of these two are computed to produce the nibble filter coefficients $n_k[m]=d_k[m]-s_k[m]$ Gain Correction Processor The clipping of the signal amplitude will introduce loss of signal power. An aspect of the Gain Correction Processor 1000 is to correct for the loss of energy due to the clipping and filtering process to maintain the power accuracy of the transmit signal.

Figure 16:
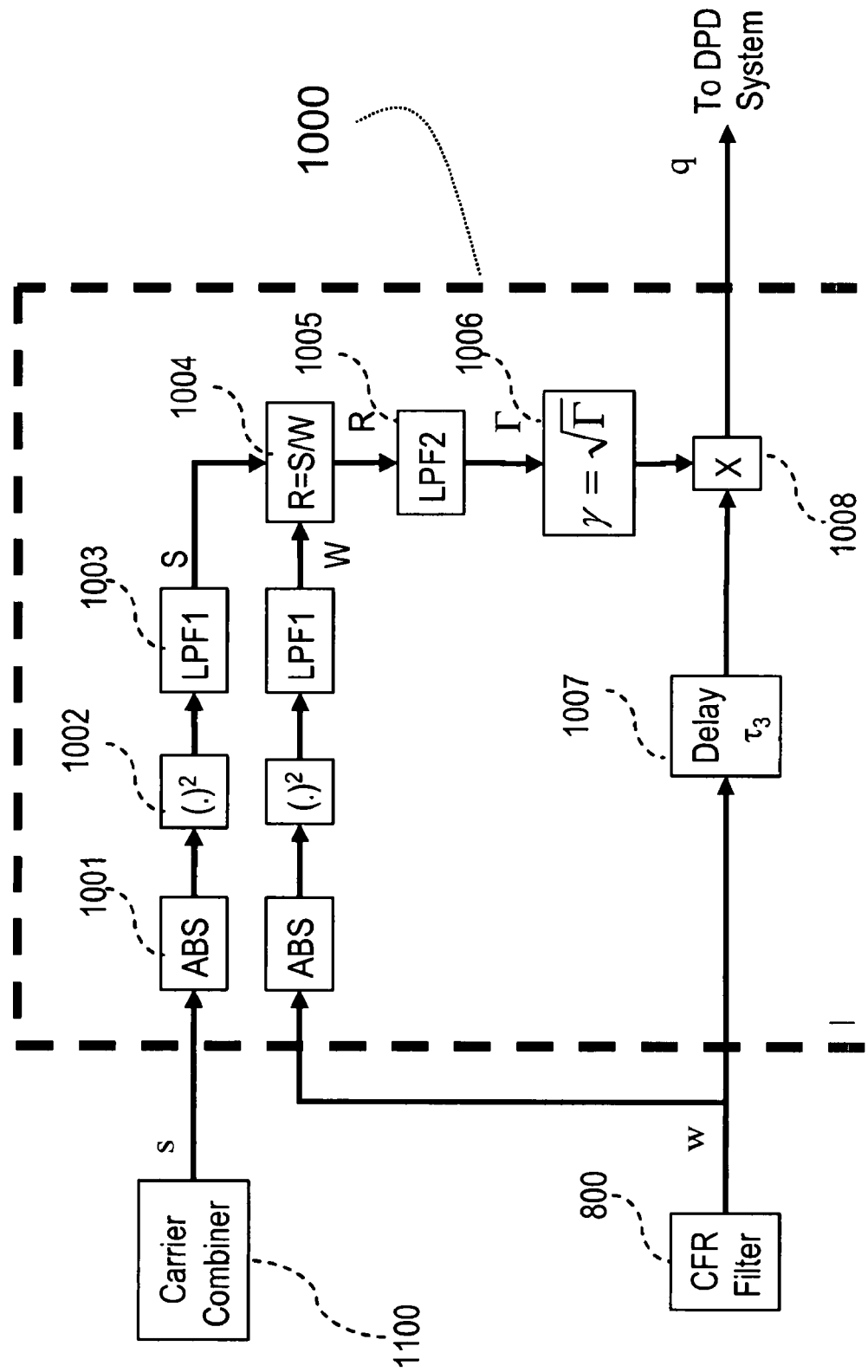
FIG. 16 is a block diagram of a Gain Correction Processor according to one embodiment of the present invention.

With reference to FIG. 16, in one embodiment, the processing steps for the Gain Correction are as follows:

(1) Compute the amplitude squared at units 1001 and 1002 of the input signal s[m] and perform low pass filtering (LPF1) at filter 1003 to produce the signal envelope S[m]. In the case that gain leveling is disabled, the signal s[m] can be replaced with the signal u[m] from Leveled Carrier Combiner 600.

(2) Compute the amplitude squared of the input signal w[m] and perform low pass filtering (LPF1) to produce the signal envelope W[m].

(3) Compute at unit 1004 the ratio signal R[m]=S[m]/W[m]. This represents the power ratio of the input and the output signal.

(4) Perform low pass filtering (LPF2) at filter 1005 to produce signal Γ.

(5) Compute at unit 1006 amplitude gain $\gamma[m]=\sqrt{\Gamma[m]}$.

(6) Optionally delay, at delay unit 1007, signal w[m] to compensate for the delay of the gain correction processing.

(7) Multiply at multiplier 1008 gain γ[m] with the CFR output w[m−τ₃] to produce signal q[m]. This signal has the same power with the source combined signal s[m]. This signal is sent to the DPD system for linearization.

Signal to Distortion (SDR) Controller

Figure 17:
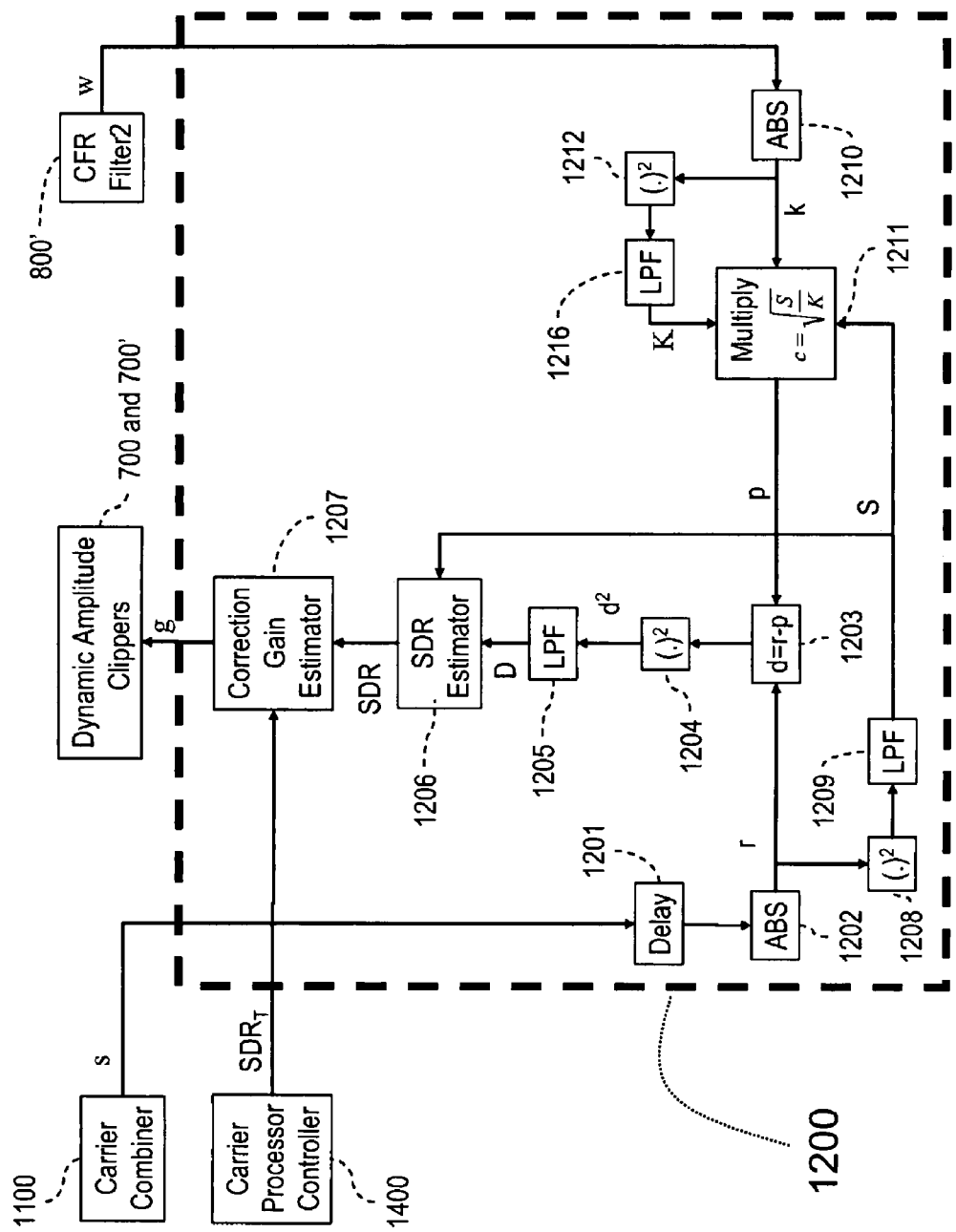
FIG. 17 is a block diagram of a Signal to Distortion (SDR) Controller according to one embodiment of the present invention.

FIG. 17 shows a block diagram of the Signal to Distortion (SDR) Controller 1200 in one embodiment of the present invention. An aspect of the SDR Controller is to determine the correction gain g to adjust the threshold at the Dynamic Amplitude Clippers 700, 700' based on the computed SDR and the threshold $SDR_T$ that is set by the Carrier Processor Controller 1400.

With reference to FIG. 17, in one embodiment, the processing steps to compute the correction gain g are as follows:

(1) Delay at delay unit 1201 the Carrier Combiner 1400 signal s by a delay value τ to align the signal r and w, the output of the second CFR Filter 800'.

(2) Compute at unit 1202 the amplitude r of input signal: r[m]=ABS(s[m−τ]).

(3) Estimate power S at unit 1208 by squaring the amplitude r[m] and passing through a low pass filter 1209.

(4) Compute at unit 1210 the amplitude k of CFR filter output signal: k[m]=ABS(w[m]).

(5) Estimate at unit 1212 power K by squaring the amplitude k[m] and passing through a low pass filter 1213.

(6) Compute at unit 1211 the signal p[m];

$$p[m] = c[m]k[m] = \sqrt{\frac{S}{K}}\, k[m]$$

so that the amplitude signals p[m] and r[m] have the same power.

(7) Compute at unit 1203 the distortion d[m]=r[m]−p[m].

(8) Estimate at unit 1204 distortion power D by squaring the amplitude d[m] and passing through a low pass filter 1205.

(9) Compute at unit 1206 signal to distortion ratio $$SDR = \frac{S}{D}.$$

(10) Because the distortion is proportional to the $3^{rd}$ order intermodulation product, the correction factor can be established at unit 1207 as $$g = \sqrt{\left(\frac{SDR}{SDR_T}\right)^{\frac{1}{3}}}$$

where the square root term translates the power ratio to a voltage ratio.

(11) Send the correction gain g to the Dynamic Amplitude Clippers 700, 700' to adjust the amplitude clipping threshold.

Carrier Processor Controller

An aspect of the Carrier Processor Controller 1400 is to coordinate operation of the carrier processors and the CFR engine. In one embodiment of the present invention, this includes the following tasks.

(1) Determine signal type of each carrier. This information is used to reconfigure the carrier processors for different types of signals that may be present (e.g., WCDMA, cdma2000, etc.). This information is also sent to the CFR Filter Configuration Processors 920 which determines CFR filter coefficients.

(2) Determine frequency of each carrier. This information is sent to the NCO 230 to frequency-shift each carrier and to the CFR Filter Configuration Processors 920 to set the CFR filter center frequencies.

(3) Activate and deactivate carrier processors. This information turns off carrier processors and this information is sent to the CFR Filter Configuration Processor to reconfigure the CFR filter coefficients.

(4) IPDL processing. During Idle Periods in the Downlink (IPDL) carriers are momentarily turned off by the Communications Modem System by either zeroing the signal for the affected carrier or by sending off/on signals to the Transmit Modem Interface 100. By either detecting the absence of a carrier by the Carrier RMS estimators 1400 or by using the off/on signals, the Carrier Processor Controller triggers filter recomputations in the CFR Filter Configurator 900. During IPDL periods, the CFR Filter Configurator 900 will zero out the appropriate filters and nibbles using the MUXes 930.

Timing and Control

In one embodiment of the present invention, the Timing and Control Processor 1300 coordinates timing-critical tasks within the Dynamic Crest Factor Reduction system. The Timing and Control Processor 1300 rapidly detects control information from the Transmit Modem Interface 100 such as Frame sync and control words. This processor may also coordinate with the time structure of the signal and at the correct time interrupt the Dynamic Amplitude Clippers 700, 700' to pause the clipping process. Timing and Control may also coordinate the transmit carrier disable. Based on this information, Timing and Control sends interrupts to the CFR Filter Configurator 900 to reconfigure the CFR filter coefficients.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A crest reduction system for gain leveling, the system comprising:
   an estimator for estimating a root-mean-square (RMS) level of a first signal carrier and an RMS level of a second signal carrier, each of the first and second signal carriers having an amplitude;
   a leveling setter for receiving the estimated RMS levels of the first and second signal carriers, for producing a first gain leveling factor and a second gain leveling factor for the first signal carrier by using the estimated RMS level of the first signal carrier, and for producing a third gain leveling factor and a fourth gain leveling factor for the second signal carrier by using the estimated RMS level of the second signal carrier;
   a first leveler for receiving the first signal carrier and the first gain leveling factor and for changing the amplitude of the first signal carrier by adjusting the first signal carrier according to the first gain leveling factor;
   a second leveler for receiving the second signal carrier and the third gain leveling factor and for changing the amplitude of the second signal carrier by adjusting the second signal carrier according to the third gain leveling factor; and
   a filter configurator for receiving the second and fourth gain leveling factors, for producing one or more first filter coefficients to further change the amplitude of the first signal carrier according to the second gain leveling factor, and for producing one or more second filter coefficients to further change the amplitude of the second signal carrier according to the fourth gain leveling factor, wherein the second gain leveling factor is substantially equal to the reciprocal of the first gain leveling factor, and wherein the fourth gain leveling factor is substantially equal to the reciprocal of the third gain leveling factor.

2. The crest reduction system of claim 1, wherein the estimator comprises a low pass filter configured by one or more scale factors, the low pass filter being for estimating at least one of the RMS level of the first signal carrier or the RMS level of the second signal carrier.

3. The crest reduction system of claim 2, wherein the low pass filter comprises an infinite impulse response filter.

4. The crest reduction system of claim 1, wherein the first signal carrier has a first signal to distortion ratio (SDR) and the second signal carrier has a second SDR different from the first SDR.

5. The crest reduction system of claim 1, wherein the first leveler is adapted to adjust the first signal carrier according to the first gain leveling factor by multiplying the amplitude of the first signal carrier by the first gain leveling factor.

6. The crest reduction system of claim 5, wherein the second leveler is adapted to adjust the second signal carrier according to the third gain leveling factor by multiplying the amplitude of the second signal carrier by the third gain leveling factor.

7. The crest reduction system of claim 1, wherein the second gain leveling factor is a multiplicative factor of at least one of the one or more first filter coefficients produced by the filter configurator.

8. The crest reduction system of claim 7, wherein the fourth gain leveling factor is a multiplicative factor of at least one of the one or more second filter coefficients produced by the filter configurator.

9. The crest reduction system of claim 1, further comprising a leveled carrier combiner for receiving the adjusted first signal carrier from the first leveler, for receiving the adjusted second signal carrier from the second leveler, and for producing a multi-carrier signal from the adjusted first signal carrier and the adjusted second signal carrier.

10. The crest reduction system of claim 9, wherein the leveled carrier combiner is adapted to produce the multi-carrier signal by coherently combining the adjusted first signal carrier and the adjusted second signal carrier.

11. A method for gain leveling in a crest reduction system, the method comprising:

estimating by an estimator circuit a root-mean-square (RMS) level of a first signal carrier and an RMS level of a second signal carrier, each of the first and second signal carriers having an amplitude;

determining by a leveling setter circuit a first gain leveling factor and a second gain leveling factor for the first signal carrier by using the estimated RMS level of the first signal carrier;

determining by the leveling setter circuit a third gain leveling factor and a fourth gain leveling factor for the second signal carrier by using the estimated RMS level of the second signal carrier;

changing by a first leveler circuit the amplitude of the first signal carrier by adjusting the first signal carrier according to the first gain leveling factor;

changing by a second leveler circuit the amplitude of the second signal carrier by adjusting the second signal carrier according to the third gain leveling factor; and determining by a filter configurator circuit one or more first filter coefficients to further change the amplitude of the first signal carrier according to the second gain leveling factor; and determining by the filter configurator circuit one or more second filter coefficients to further change the amplitude of the second signal carrier according to the fourth gain leveling factor, wherein the second gain leveling factor is substantially equal to the reciprocal of the first gain leveling factor, and wherein the fourth gain leveling factor is substantially equal to the reciprocal of the third gain leveling factor.

12. The method of claim 11, wherein the estimating the RMS level of the first signal carrier and the RMS level of the second signal carrier comprises performing low pass filtering of at least one of the first and second signal carriers according to one or more scale factors.

13. The method of claim 12, wherein the performing low pass filtering comprises performing infinite impulse response filtering.

14. The method of claim 11, wherein the first signal carrier has a first signal to distortion ratio (SDR) and the second signal carrier has a second SDR different from the first SDR.

15. The method of claim 11, wherein the adjusting the first signal carrier according to the first gain leveling factor comprises multiplying the amplitude of the first signal carrier by the first gain leveling factor.

16. The method of claim 15, wherein the adjusting the second signal carrier according to the third gain leveling factor comprises multiplying the amplitude of the second signal carrier by the third gain leveling factor.

17. The method of claim 11, wherein the second gain leveling factor is a multiplicative factor of at least one of the one or more first filter coefficients.

18. The method of claim 17, wherein the fourth gain leveling factor is a multiplicative factor of at least one of the one or more second filter coefficients.

19. The method of claim 11, further comprising:
producing a multi-carrier signal from the adjusted first signal carrier and the adjusted second signal carrier.

20. The method of claim 19, wherein the producing the multi-carrier signal comprises coherently combining the adjusted first signal carrier and the adjusted second signal carrier.

21. A crest reduction system for gain leveling, the system comprising:

means for estimating a root-mean-square (RMS) level of a first signal carrier and an RMS level of a second signal carrier, each of the first and second signal carriers having an amplitude;

means for determining a first gain leveling factor and a second gain leveling factor for the first signal carrier by using the estimated RMS level of the first signal carrier and for determining a third gain leveling factor and a fourth gain leveling factor for the second signal carrier by using the estimated RMS level of the second signal carrier;

means for changing the amplitude of the first signal carrier by adjusting the first signal carrier according to the first gain leveling factor;

means for changing the amplitude of the second signal carrier by adjusting the second signal carrier according to the third gain leveling factor; and means for determining one or more first filter coefficients to further change the amplitude of the first signal carrier according to the second gain leveling factor and for determining one or more second filter coefficients to further change the amplitude of the second signal carrier according to the fourth gain leveling factor, wherein the second gain leveling factor is substantially equal to the reciprocal of the first gain leveling factor, and wherein the fourth gain leveling factor is substantially equal to the reciprocal of the third gain leveling factor.

22. The crest reduction system of claim 21, wherein the means for estimating comprises a low pass filter configured by one or more scale factors, the low pass filter being for estimating at least one of the RMS level of the first signal carrier or the RMS level of the second signal carrier.

23. The crest reduction system of claim 22, wherein the low pass filter comprises an infinite impulse response filter.

24. The crest reduction system of claim 21, wherein the first signal carrier has a first signal to distortion ration (SDR) and the second signal carrier has a second SDR different from the first SDR.

25. The crest reduction system of claim 21, wherein the means for changing the SDR of the first signal carrier is adapted to adjust the first signal carrier according to the first gain leveling factor by multiplying the amplitude of the first signal carrier by the first gain leveling factor.

26. The crest reduction system of claim 25, wherein the means for changing the SDR of the second signal carrier is adapted to adjust the second signal carrier according to the third gain leveling factor by multiplying the amplitude of the second signal carrier by the third gain leveling factor.

27. The crest reduction system of claim 21, wherein the second gain leveling factor is a multiplicative factor of at least one of the one or more first filter coefficients produced by the means for determining.

28. The crest reduction system of claim 27, wherein the fourth gain leveling factor is a multiplicative factor of at least one of the one or more second filter coefficients produced by the means for determining.

29. The crest reduction system of claim 21, further comprising means for producing a multi-carrier signal from the adjusted first signal carrier and the adjusted second signal carrier.

30. The crest reduction system of claim 29, wherein the means for producing is adapted to produce the multi-carrier signal by coherently combining the adjusted first signal carrier and the adjusted second signal carrier.

31. A crest reduction system for amplitude limiting, the system comprising:
a controller for receiving a first signal including one or more signal carriers, for determining a signal to distortion ratio (SDR) of the first signal, and for producing a correction value by using the determined SDR and a threshold SDR; and
a dynamic amplitude clipper for receiving the correction value and a second signal corresponding to the first signal and for producing a clipped signal by limiting an amplitude of the second signal according to a value corresponding to the correction value such that a peak to average ratio (PAR) of the clipped signal is not greater than a PAR of the second signal,
wherein the clipped signal has phase characteristics substantially equal to phase characteristics of the second signal.

32. The crest reduction system of claim 31, further comprising:
a second dynamic amplitude clipper coupled with the dynamic amplitude clipper, the second dynamic amplitude clipper being for receiving the correction value and a third signal corresponding to the clipped signal and for producing a second clipped signal by limiting an amplitude of the third signal according to a second value corresponding to the correction value such that a PAR of the second clipped signal is not greater than a PAR of the third signal,
wherein the second clipped signal has phase characteristics substantially equal to phase characteristics of the third signal.

33. The crest reduction system of claim 32, wherein the phase characteristics of the second clipped signal are substantially equal to phase characteristics of the clipped signal.

34. The crest reduction system of claim 32, wherein the dynamic amplitude clipper comprises an estimator for estimating a root-mean-square (RMS) level of the second signal,
wherein the value corresponding to the correction value further corresponds to the estimated RMS level of the second signal such that the PAR of the clipped signal is substantially constant over time,
wherein the second dynamic amplitude clipper comprises an estimator for estimating an RMS level of the third signal, and
wherein the second value corresponding to the correction value further corresponds to the estimated RMS level of the third signal such that the PAR of the second clipped signal is substantially constant over time.

35. The crest reduction system of claim 31, wherein the dynamic amplitude clipper comprises an estimator for estimating a root-mean-square (RMS) level of the second signal, and
wherein the value corresponding to the correction value further corresponds to the estimated RMS level of the second signal such that the PAR of the clipped signal is substantially constant over time.

36. The crest reduction system of claim 35, wherein the estimator for estimating the power of the second signal comprises an infinite impulse response filter.

37. The crest reduction system of claim 31, further comprising:
a gain corrector for receiving a third signal corresponding to the clipped signal and for reducing an energy loss of the third signal resulting from the limiting of the amplitude of the second signal by the dynamic amplitude clipper.

38. The crest reduction system of claim 31, wherein the dynamic amplitude clipper is adapted to be controlled to produce an unclipped signal from the second signal, and
wherein a PAR of the unclipped signal is substantially equal to the PAR of the second signal.

39. The crest reduction system of claim 38, further comprising:
a timing and control unit for controlling the dynamic amplitude clipper to produce the unclipped signal.

40. The crest reduction system of claim 31, wherein the dynamic amplitude clipper comprises:
a first multiplier for multiplying the second signal and an inverse of the value corresponding to the correction value; and
a second multiplier for producing the clipped signal by multiplying a third signal corresponding to the second signal and the value corresponding to the correction value.

41. A method for amplitude limiting in a crest reduction system, the method comprising:
receiving by a controller circuit a first signal including one or more signal carriers;
determining by the controller circuit a signal to distortion ratio (SDR) of the first signal;
producing by the controller circuit a correction value by using the determined SDR and a threshold SDR;
electrically producing a second signal corresponding to the first signal; and
producing by a dynamic amplitude clipper circuit a clipped signal by limiting an amplitude of the second signal according to a value corresponding to the correction value such that a peak to average ratio (PAR) of the clipped signal is not greater than a PAR of the second signal,
wherein the clipped signal has phase characteristics substantially equal to phase characteristics of the second signal.

42. The method of claim 41, further comprising:
producing a third signal corresponding to the clipped signal; and
producing a second clipped signal by limiting an amplitude of the third signal according to the value corresponding to the correction value such that a peak to average ratio (PAR) of the second clipped signal is not greater than a PAR of the third signal,
wherein the second clipped signal has phase characteristics substantially equal to phase characteristics of the third signal.

43. The method of claim 42, wherein the phase characteristics of the second clipped signal are substantially equal to phase characteristics of the clipped signal.

44. The method of claim 42, wherein the producing the clipped signal comprises estimating a root-mean-square (RMS) level of the second signal,
wherein the value corresponding to the correction value further corresponds to the estimated RMS level of the second signal such that the PAR of the clipped signal is substantially constant over time,
wherein the producing the second clipped signal comprises estimating an RMS level of the third signal, and
wherein the second value corresponding to the correction value further corresponds to the estimated RMS level of the third signal such that the PAR of the clipped signal is substantially constant over time.

45. The method of claim 41, wherein the producing the clipped signal comprises estimating a root-mean-square (RMS) level of the second signal, and
wherein the value corresponding to the correction value further corresponds to the estimated RMS level of the second signal such that the PAR of the clipped signal is substantially constant over time.

46. The method of claim 45, wherein the estimating the power of the second signal comprises performing infinite impulse response filtering.

47. The method of claim 41, further comprising:
producing a third signal corresponding to the clipped signal; and
reducing an energy loss of the third signal resulting from the limiting of the amplitude of the second signal.

48. The method of claim 41, wherein the producing the clipped signal comprises detecting one or more commands to produce an unclipped signal from the second signal, and
wherein a PAR of the unclipped signal is substantially equal to the PAR of the second signal.

49. The method of claim 48, further comprising:
commanding the production of the unclipped signal.

50. The method of claim 41, wherein the producing the clipped signal comprises:
multiplying the second signal and an inverse of the value corresponding to the correction value; and
producing the clipped signal by multiplying a third signal corresponding to the second signal and the value corresponding to the correction value.

51. A crest reduction system for amplitude limiting, the system comprising:
means for receiving a first signal including one or more signal carriers, for determining a signal to distortion ratio (SDR) of the first signal, and for producing a correction value by using the determined SDR and a threshold SDR; and
means for producing a second signal corresponding to the first signal, for producing a clipped signal by limiting an amplitude of the second signal according to a value corresponding to the correction value such that a peak to average ratio (PAR) of the clipped signal is not greater than a PAR of the second signal,
wherein the clipped signal has phase characteristics substantially equal to phase characteristics of the second signal.

52. The crest reduction system of claim 51, further comprising:
means for producing a third signal corresponding to the clipped signal;
means for producing a second clipped signal by limiting an amplitude of the third signal according to the value corresponding to the correction value such that a peak to average ratio (PAR) of the second clipped signal is not greater than a PAR of the third signal, the means for producing the second clipped signal being coupled with the means for producing the second signal,
wherein the second clipped signal has phase characteristics substantially equal to phase characteristics of the third signal.

53. The crest reduction system of claim 52, wherein the phase characteristics of the second clipped signal are substantially equal to phase characteristics of the clipped signal.

54. The crest reduction system of claim 52, wherein the means for producing the second signal comprises an estimator for estimating a root-mean-square (RMS) level of the second signal,
wherein the value corresponding to the correction value further corresponds to the estimated RMS level of the second signal such that the PAR of the clipped signal is substantially constant over time,
wherein the means for producing the third signal comprises an estimator for estimating an RMS level of the third signal,
wherein the second value corresponding to the correction value further corresponds to the estimated RMS level of the third signal such that the PAR of the clipped signal is substantially constant over time.

55. The crest reduction system of claim 51, wherein the means for producing the second signal comprises an estimator for estimating a root-mean-square (RMS) level of the second signal, and
wherein the value corresponding to the correction value further corresponds to the estimated RMS level of the second signal such that the PAR of the clipped signal is substantially constant over time.

56. The crest reduction system of claim 55, wherein the estimator for estimating the RMS level of the second signal comprises an infinite impulse response filter.

57. The crest reduction system of claim 51, further comprising:
means for producing a third signal corresponding to the clipped signal; and
means for reducing an energy loss of the third signal resulting from the limiting of the amplitude of the second signal.

58. The crest reduction system of claim 51, wherein the means for producing the second signal is adapted to be controlled to produce an unclipped signal from the second signal, and
wherein a PAR of the unclipped signal is substantially equal to the PAR of the second signal.

59. The crest reduction system of claim 58, further comprising:
means for controlling the means for producing the second signal to produce the unclipped signal.

60. The crest reduction system of claim 51, wherein the means for producing the second signal comprises:
a first multiplier for multiplying the second signal and an inverse of the value corresponding to the correction value; and
a second multiplier for producing the clipped signal by multiplying a third signal corresponding to the second signal and the value corresponding to the correction value.

61. A crest reduction system for composite filtering, the system comprising:
a timing and control unit for receiving a first signal including a plurality of signal carriers and for processing a detected absence of one or more of the signal carriers;
a filter configurator for producing a plurality of composite coefficients for filtering of the signal, each of the composite coefficients being formed from a plurality of coefficients, and for zeroing one or more of the coefficients corresponding to the one or more signal carriers in response to the detected absence of the one or more signal carriers; and
a filter generator for receiving the composite coefficients and for implementing a filter for a second signal corresponding to the first signal, the filter being configured to output a third signal by filtering the second signal according to the composite coefficients.

62. The crest reduction system of claim 61, wherein the filter is further configured to output the third signal by substantially filtering out one or more frequency components of the second signal corresponding to the zeroed one or more of the coefficients.

63. The crest reduction system of claim 61, wherein the filter configurator comprises a plurality of multiplexer units, each of the multiplexer units being adapted to receive one or more of the coefficients corresponding to one of the signal carriers and to output either the one or more of the coefficients or one or more zero value coefficients in response to the detected absence of the one of the signal carriers.

64. The crest reduction system of claim 63, wherein the filter configurator further comprises a combiner for receiving the respective outputs of the multiplexer units and for producing the composite coefficients by linearly combining the respective outputs.

65. The crest reduction system of claim 61, further comprising:
a second filter generator for receiving the composite coefficients and for implementing a second filter for a fourth signal corresponding to the third signal, the second filter being configured to output a fifth signal by filtering the fourth signal according to the composite coefficients.

66. The crest reduction system of claim 65, wherein the second filter is further configured to output the fifth signal by substantially filtering out one or more frequency components of the fourth signal corresponding to the zeroed one or more of the coefficients.

67. The crest reduction system of claim 61, wherein a first one of the signal carriers has a first passband,
wherein a second one of the signal carriers has a second passband, the first passband and the second passband forming a frequency well therebetween, and
wherein the filter configurator further is for producing a plurality of nibble coefficients for the filtering of the signal, the nibble coefficients being configured to substantially fill the frequency well.

68. The crest reduction system of claim 67, wherein the filter configurator comprises a multiplexer unit adapted to receive one or more of the nibble coefficients corresponding to the first one of the signal carriers and the second one of the signal carriers and to output either the one or more of the nibble coefficients or one or more zero value coefficients in response to the detected absence of at least one of the first one of the signal carriers or the second one of the signal carriers.

69. A method for composite filtering in a crest reduction system, the method comprising:
receiving a first signal including a plurality of signal carriers;
processing a detected absence of one or more of the signal carriers;
producing a plurality of composite coefficients for filtering of the signal, each of the composite coefficients being formed from a plurality of coefficients;
zeroing one or more of the coefficients corresponding to the one or more signal carriers in response to the detected absence of the one or more signal carriers; and
implementing a filter for a second signal corresponding to the first signal, the filter being configured to output a third signal by filtering the second signal according to the composite coefficients.

70. The method of claim 69, wherein the filter is further configured to output the third signal by substantially filtering out one or more frequency components of the second signal corresponding to the zeroed one or more of the coefficients.

71. The method of claim 69, wherein the producing the composite coefficients comprises receiving one or more of the coefficients corresponding to one of the signal carriers and outputting either the one or more of the coefficients or one or more zero value coefficients in response to the detected absence of the one of the signal carriers.

72. The method of claim 71, wherein the producing the composite coefficients further comprises linearly combining the outputted either the one or more of the coefficients or one or more zero value coefficients and one or more of the coefficients corresponding to another of the signal carriers.

73. The method of claim 69, further comprising:
producing a fourth signal corresponding to the third signal; and
implementing a second filter for the fourth signal, the second filter being configured to output a fifth signal by filtering the fourth signal according to the composite coefficients.

74. The method of claim 73, wherein the second filter is further configured to output the fifth signal by substantially filtering out one or more frequency components of the fourth signal corresponding to the zeroed one or more of the coefficients.

75. The method of claim 69, wherein a first one of the signal carriers has a first passband, wherein a second one of the signal carriers has a second passband, the first passband and the second passband forming a frequency well therebetween, and wherein the method further comprises producing a plurality of nibble coefficients for the filtering of the signal, the nibble coefficients being configured to substantially fill the frequency well.

76. The method of claim 75, wherein the producing the composite nibble coefficient comprises outputting either the one or more of the nibble coefficients or one or more zero value coefficients in response to the detected absence of at least one of the first one of the signal carriers or the second one of the signal carriers.

77. A crest reduction system for composite filtering, the system comprising:

means for receiving a first signal including a plurality of signal carriers and for processing a detected absence of one or more of the signal carriers;

means for producing a plurality of composite coefficients for filtering of the signal, each of the composite coefficients being formed from a plurality of coefficients, and for zeroing one or more of the coefficients corresponding to the one or more signal carriers in response to the detected absence of the one or more signal carriers; and means for implementing a filter for a second signal corresponding to the first signal, the filter being configured to output a third signal by filtering the second signal according to the composite coefficients.

78. The crest reduction system of claim 77, wherein the filter is further configured to output the third signal by substantially filtering out one or more frequency components of the second signal corresponding to the zeroed one or more of the coefficients.

79. The crest reduction system of claim 77, wherein the means for implementing the filter comprises a plurality of multiplexer units, each of the multiplexer units being adapted to receive one or more of the coefficients corresponding to one of the signal carriers and to output either the one or more of the coefficients or one or more zero value coefficients in response to the detected absence of the one of the signal carriers.

80. The crest reduction system of claim 79, wherein the means for implementing the filter further comprises a combiner for receiving the respective outputs of the multiplexer units and for producing the composite coefficients by linearly combining the respective outputs.

81. The crest reduction system of claim 77, further comprising:

means for implementing a second filter for a fourth signal corresponding to the third signal, the second filter being configured to output a fifth signal by filtering the fourth signal according to the composite coefficients.

82. The crest reduction system of claim 81, wherein the second filter is further configured to output the fifth signal by substantially filtering out one or more frequency components of the fourth signal corresponding to the zeroed one or more of the coefficients.

83. The crest reduction system of claim 77, wherein a first one of the signal carriers has a first passband, wherein a second one of the signal carriers has a second passband, the first passband and the second passband forming a frequency well therebetween, and wherein the means for implementing the filter is further for producing a plurality of nibble coefficients for the filtering of the signal, the nibble coefficients being configured to substantially fill the frequency well.

84. The crest reduction system of claim 83, wherein the means for implementing the filter comprises a multiplexer unit adapted to receive one or more of the nibble coefficients corresponding to the first one of the signal carriers and the second one of the signal carriers and to output either the one or more of the nibble coefficients or one or more zero value coefficients in response to the detected absence of at least one of the first one of the signal carriers or the second one of the signal carriers.

85. A crest reduction system comprising:

a controller for receiving a first frequency and a first bandwidth of a first baseband symbol stream and for receiving a second frequency and a second bandwidth of a second baseband symbol stream;

a first carrier processor for receiving the first baseband symbol stream and for converting the first baseband symbol stream to a first signal having the first bandwidth centered about the first frequency;

a second carrier processor for receiving the second baseband symbol stream and for converting the second baseband symbol stream to a second signal having the second bandwidth centered about the second frequency; and one or more signals processors for receiving the first and second signals and for adjusting a respective signal to distortion ratio (SDR) of each of the first and second signals while a peak to average ratio (PAR) of a composite signal produced from the first and second signals is reduced.

86. The crest reduction system of claim 85, wherein the first frequency has a value different from a value of the second frequency.

87. The crest reduction system of claim 86, wherein the first bandwidth has a frequency range different from a frequency range of the second bandwidth.

88. The crest reduction system of claim 85, wherein the first bandwidth has a frequency range substantially equal to a frequency range of the second bandwidth.

89. The crest reduction system of claim 85, wherein the first baseband symbol stream corresponds to a WCDMA signal, and wherein the second baseband symbol stream corresponds to a cdma2000 signal.

90. The crest reduction system of claim 85, further comprising:

a combiner for receiving the first and second signals and for producing a multi-carrier signal from the first and second signals.

91. The crest reduction system of claim 90, wherein the combiner is adapted to produce the multi-carrier signal by coherently combining the first and second signals.

92. The crest reduction system of claim 85, wherein the first carrier processor is adapted to increase a sample rate of the first baseband symbol stream according to a first rate to produce a first intermediate signal, wherein the second carrier processor is adapted to increase a sample rate of the second baseband symbol stream according to a second rate to produce a second intermediate signal, wherein the first rate has a value different from a value of the second rate, wherein the first carrier processor comprises a first resampler for resampling the first intermediate signal according to a third rate to produce the first signal, and wherein the second carrier processor comprises a second resampler for resampling the second intermediate signal according to a fourth rate substantially equal to the third rate to produce the second signal.

93. A method of signal converting in a crest reduction system, the method comprising:
- receiving by a controller circuit a first frequency and a first bandwidth corresponding to a first baseband symbol stream;
- receiving by the controller circuit a second frequency and a second bandwidth corresponding to a second baseband symbol stream;
- converting by a first carrier processor the first baseband symbol stream to a first signal having the first bandwidth centered about the first frequency;
- converting by a second carrier processor the second baseband symbol stream to a second signal having the second bandwidth centered about the second frequency; and
- adjusting by one or more signals processors a respective signal to distortion ratio (SDR) of each of the first and second signals while a peak to average ratio (PAR) of a composite signal produced from the first and second signals is reduced.

94. The method of claim 93, wherein the first frequency has a value different from a value of the second frequency.

95. The method of claim 94, wherein the first bandwidth has a frequency range different from a frequency range of the second bandwidth.

96. The method of claim 93, wherein the first bandwidth has a frequency range substantially equal to a frequency range of the second bandwidth.

97. The method of claim 93, wherein the first baseband symbol stream corresponds to a WCDMA signal, and
- wherein the second baseband symbol stream corresponds to a cdma2000 signal.

98. The method of claim 93, further comprising:
producing a multi-carrier signal from the first and second signals.

99. The method of claim 98, wherein the producing the multi-carrier signal comprises coherently combining the first and second signals.

100. The method of claim 93, wherein the converting the first baseband symbol stream comprises increasing a sample rate of the first baseband symbol stream according to a first rate to produce a first intermediate signal,
- wherein the converting the second baseband symbol stream comprises increasing a sample rate of the second baseband symbol stream according to a second rate to produce a second intermediate signal,
- wherein the first rate has a value different from a value of the second rate,
- wherein the converting the first baseband symbol stream further comprises resampling the first intermediate signal according to a third rate to produce the first signal, and
- wherein the converting the second baseband symbol stream further comprises resampling the second intermediate signal according to a fourth rate substantially equal to the third rate to produce the second signal.

101. A crest reduction system comprising:
- means for receiving a first frequency and a first bandwidth corresponding to a first baseband symbol stream and for receiving a second frequency and a second bandwidth corresponding to a second baseband symbol stream;
- means for converting the first baseband symbol stream to a first signal having the first bandwidth centered about the first frequency;
- means for converting the second baseband symbol stream to a second signal having the second bandwidth centered about the second frequency; and
- means for adjusting a respective signal to distortion ratio (SDR) of each of the first and second signals while a peak to average ratio (PAR) of a composite signal produced from the first and second signals is reduced.

102. The crest reduction system of claim 101, wherein the first frequency has a value different from a value of the second frequency.

103. The crest reduction system of claim 102, wherein the first bandwidth has a frequency range different from a frequency range of the second bandwidth.

104. The crest reduction system of claim 101, wherein the first bandwidth has a frequency range substantially equal to a frequency range of the second bandwidth.

105. The crest reduction system of claim 101, wherein the first baseband symbol stream corresponds to a WCDMA signal, and
- wherein the second baseband symbol stream corresponds to a cdma2000 signal.

106. The crest reduction system of claim 101, further comprising:
- means for receiving the first and second signals and for producing a multi-carrier signal from the first and second signals.

107. The crest reduction system of claim 106, wherein the means for receiving the first and second signals is adapted to produce the multi-carrier signal by coherently combining the first and second signals.

108. The crest reduction system of claim 101, wherein the means for converting the first baseband symbol stream is adapted to increase a sample rate of the first baseband symbol stream according to a first rate to produce a first intermediate signal,
- wherein the means for converting the second baseband symbol stream is adapted to increase a sample rate of the second baseband symbol stream according to a second rate to produce a second intermediate signal,
- wherein the first rate has a value different from a value of the second rate,
- wherein the means for converting the first baseband symbol stream comprises a first resampler for resampling the first intermediate signal according to a third rate to produce the first signal, and
- wherein the means for converting the second baseband symbol stream comprises a second resampler for resampling the second intermediate signal according to a fourth rate substantially equal to the third rate to produce the second signal.

* * * * *